(12) United States Patent
Hamada et al.

(10) Patent No.: US 7,369,745 B2
(45) Date of Patent: May 6, 2008

(54) DATA RECORDING DEVICE AND METHOD, PROGRAM STORAGE MEDIUM, AND PROGRAM

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 889 days.

(21) Appl. No.: 10/479,512

(22) PCT Filed: Apr. 7, 2003

(86) PCT No.: PCT/JP03/04383

§ 371 (c)(1),
(2), (4) Date: Dec. 10, 2003

(87) PCT Pub. No.: WO03/085972

PCT Pub. Date: Oct. 16, 2003

(65) Prior Publication Data

US 2004/0234237 A1 Nov. 25, 2004

(30) Foreign Application Priority Data

Apr. 10, 2002 (JP) ............................. 2002-107911

(51) Int. Cl.
*H04N 5/93* (2006.01)
*G11B 27/00* (2006.01)

(52) U.S. Cl. .......................................... 386/52; 386/55
(58) Field of Classification Search ................... 386/52
See application file for complete search history.

(56) References Cited

U.S. PATENT DOCUMENTS 5,206,929 A * 4/1993 Langford et al. ........... 715/723
5,521,898 A * 5/1996 Ogasawara ................. 386/112
5,732,067 A * 3/1998 Aotake ..................... 369/275.3
6,519,656 B2 * 2/2003 Kondo et al. ................. 710/6
6,636,687 B1 * 10/2003 Ando et al. .................. 386/55
2002/0110354 A1 * 8/2002 Ikeda et al. ................... 386/52

FOREIGN PATENT DOCUMENTS

| JP | 9-050676 | 2/1997 |
|---|---|---|
| JP | 11-289541 | 10/1999 |
| JP | 2002-230948 | 8/2002 |
| WO | WO9222983 | * 12/1992 |

* cited by examiner

*Primary Examiner*—Thai Q. Tran
*Assistant Examiner*—Anner Holder
(74) *Attorney, Agent, or Firm*—Oblon, Spivak, McClelland, Maier & Neustadt, P.C.

(57) ABSTRACT

This invention relates to a data recording apparatus, a data recording method, a program storage medium, and a program whereby data recorded on an information recording medium is edited and reproduced in a suitably controlled manner. Where an AV stream file including PlayItems is edited, the preceding PlayItem is considered to include an Imaginary Extent 111P as part of a frame data Extent designated by an OUT_point of the item, the Imaginary Extent 111P being reproduced within the preceding PlayItem, and the current PlayItem is considered to have an Imaginary Extent 111C as part of a frame data Extent indicated by an IN_point of the item, the Imaginary Extent 111C being reproduced within the current PlayItem. A control unit of a DV recording/reproducing apparatus compares each of the Imaginary Extents 111P and 111C with a minimum Extent size in order to establish connection_condition information. This invention may be applied advantageously to DV recording/reproducing apparatuses for recording video data to an optical disk.

12 Claims, 32 Drawing Sheets

*BACKGROUND ART*

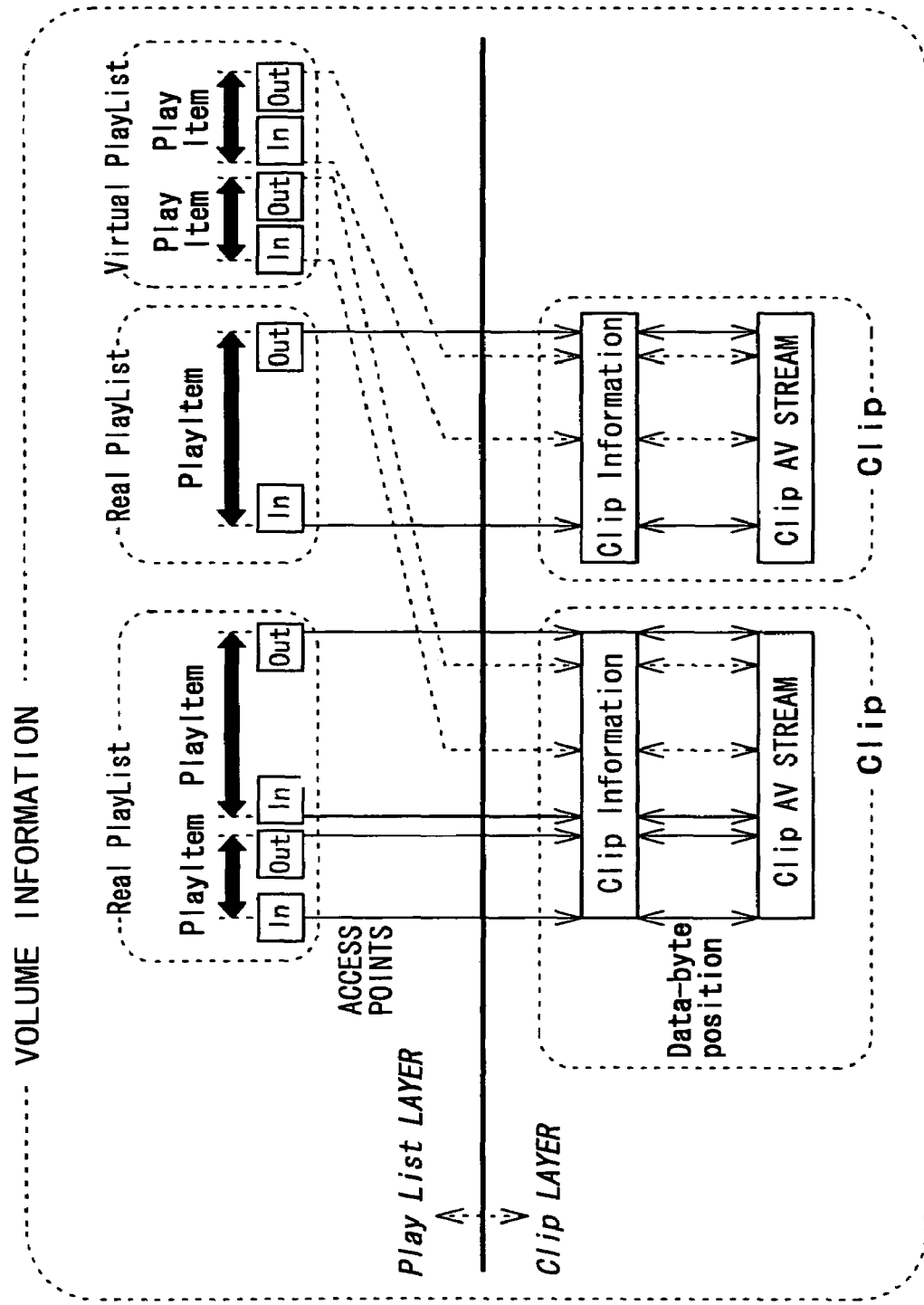

F I G. 4

| Syntax | No.of bits | Mnemonic |
|---|---|---|
| PlayList() { | | |
|     length | 32 | uimsbf |
|     reserved_for_word_align | 12 | bslbf |
|     PL_CPI_type | 4 | bslbf |
|     number_of_PlayItems | 16 | uimsbf |
|     if ((Vitual-PlayList) && CPI_type==1 ) { | | |
|         number_of_SubPlayItems | 16 | uimsbf |
|     } else { | | |
|         reserved_for_word_align | 16 | bslbf |
|     } | | |
|     for ( PlayItem_id=0; | | |
|         PlayItem_id<number_of_PlayItems; | | |
|         PlayItem_id++) { | | |
|         PlayItem() | | |
|     } | | |
|     if ((Vitual-PlayList) &&CPI_type==1 ) { | | |
|         for ( I=0;i<number_of_PlayItems; i++) { | | |
|             SubPlayItem() | | |
|         } | | |
|     } | | |
| } | | |

FIG. 5

| Syntax | No. of bits | Mnemonic |
|---|---|---|
| PlayItem() { | | |
|   length | 16 | uimsbf |
|   Clip_Information_file_name | 8*5 | bslbf |
|   Clip_codec_Identifier | 8*4 | bslbf |
|   reserved_for_future_use | 12 | bslbf |
|   connection_condition | 4 | uimsbf |
|   if (CPI_type==1) { | | |
|     ref_to_STC_id | 8 | uimsbf |
|   } else { | | |
|     reserved_for_word_align | 8 | bslbf |
|   } | | |
|   IN_time | 32 | uimsbf |
|   OUT_time | 32 | uimsbf |
|   if (<Vitual-PlayList> && connection_condition==3 ) { | | |
|     BridgeSequenceinfo() | | |
|   } | | |
| } | | |

FIG. 7

| Syntax | No. of bits | Mnemonic |
|---|---|---|
| zzzzz.clpi { | | |
|   type_indicator | 8*4 | bslbf |
|   version_number | 8*4 | bslbf |
|   DVF_SequenceInfo_start_address | 32 | uimsbf |
|   ClipMark_start_address | 32 | uimsbf |
|   MakersPrivateData_start_address | 32 | uimsbf |
|   reserved_for_future_use | 160 | bslbf |
|   DV_ClipInfo() | | |
|   for (i=0; i <N1; i ++) { | | |
|     padding_word | 16 | bslbf |
|   } | | |
|   DVF_SequenceInfo() | | |
|   for (i=0; i <N2; i ++) { | | |
|     padding_word | 16 | bslbf |
|   } | | |
|   ClipMark() | | |
|   for (i=0; i <N3; i ++) { | | |
|     padding_word | 16 | bslbf |
|   } | | |
|   MakersPrivateData() | | |
|   for (i=0; i <N4; i ++) { | | |
|     padding_word | 16 | bslbf |
|   } | | |
| } | | |

FIG. 8

| Syntax | No. of bits | Mnemonic |
|---|---|---|
| DV_ClipInfo(){ | | |
|   length | 32 | uimsbf |
|   reserved_for_future_use | 16 | bslbf |
|   Clip_stream_type | 8 | uimsbf |
|   reserved_for_word_align | 4 | bslbf |
|   DV_type | 4 | uimsbf |
|   if (Clip_stream_type==2) { | | |
|     preceding_Clip_Information_file_name | 8*5 | bslbf |
|     Clip_codec_identifier | 8*4 | bslbf |
|     reserved_for_future_use | 8 | bslbf |
|     FN_exit_from_preceding_Clip | 32 | uimsbf |
|     following_Clip_Information_file_name | 8*5 | bslbf |
|     Clip_codec_identifier | 8*4 | bslbf |
|     reserved_for_future_use | 8 | bslbf |
|     FN_enter_to_following_Clip | 32 | uimsbf |
|   } | | |
| } | | |

F I G. 9

| Syntax | No.of bits | Mnemonic |
|---|---|---|
| DVF_SequenceInfo() { | | |
|    length | 32 | uimsbf |
|    reserved_for_word_align | 8 | bslbf |
|    num_of_DVF_sequences | 8 | uimsbf |
|    for (dvsq_id=0; dvsq_id=<num_of_DVF_ sequences; dvsq_id++ ) { | | |
|       offset_frame_number[dvsq_id] | 32 | uimsbf |
|       num_of_frames[dvsq_id] | 32 | uimsbf |
|       leading_data_size[dvsq_id] | 32 | uimsbf |
|       trailing_data_size[dvsq_id] | 32 | uimsbf |
|    } | | |
| } | | |

F I G. 1 1

| Syntax | No. of bits | Mnemonic |
|---|---|---|
| xxxxx.rpls / yyyy.vpls { | | |
|   type_indicator | 8*4 | bslbf |
|   version_number | 8*4 | bslbf |
|   PlayList_start_address | 32 | uimsbf |
|   PlayListMark_start_address | 32 | uimsbf |
|   MakersPrivateData_start_address | 32 | uimsbf |
|   reserved_for_future_use | 160 | bslbf |
|   UIAppInfoPlayList() | | |
|   for (i=0; i <N1; i ++) { | | |
|     padding_word | 16 | bslbf |
|   } | | |
|   PlayList() | | |
|   for (i=0; i <N2; i ++) { | | |
|     padding_word | 16 | bslbf |
|   } | | |
|   PlayListMark() | | |
|   for (i=0; i <N3; i ++) { | | |
|     padding_word | 16 | bslbf |
|   } | | |
|   MakersPrivateData() | | |
|   for (i=0; i <N4; i ++) { | | |
|     padding_word | 16 | bslbf |
|   } | | |
| } | | |

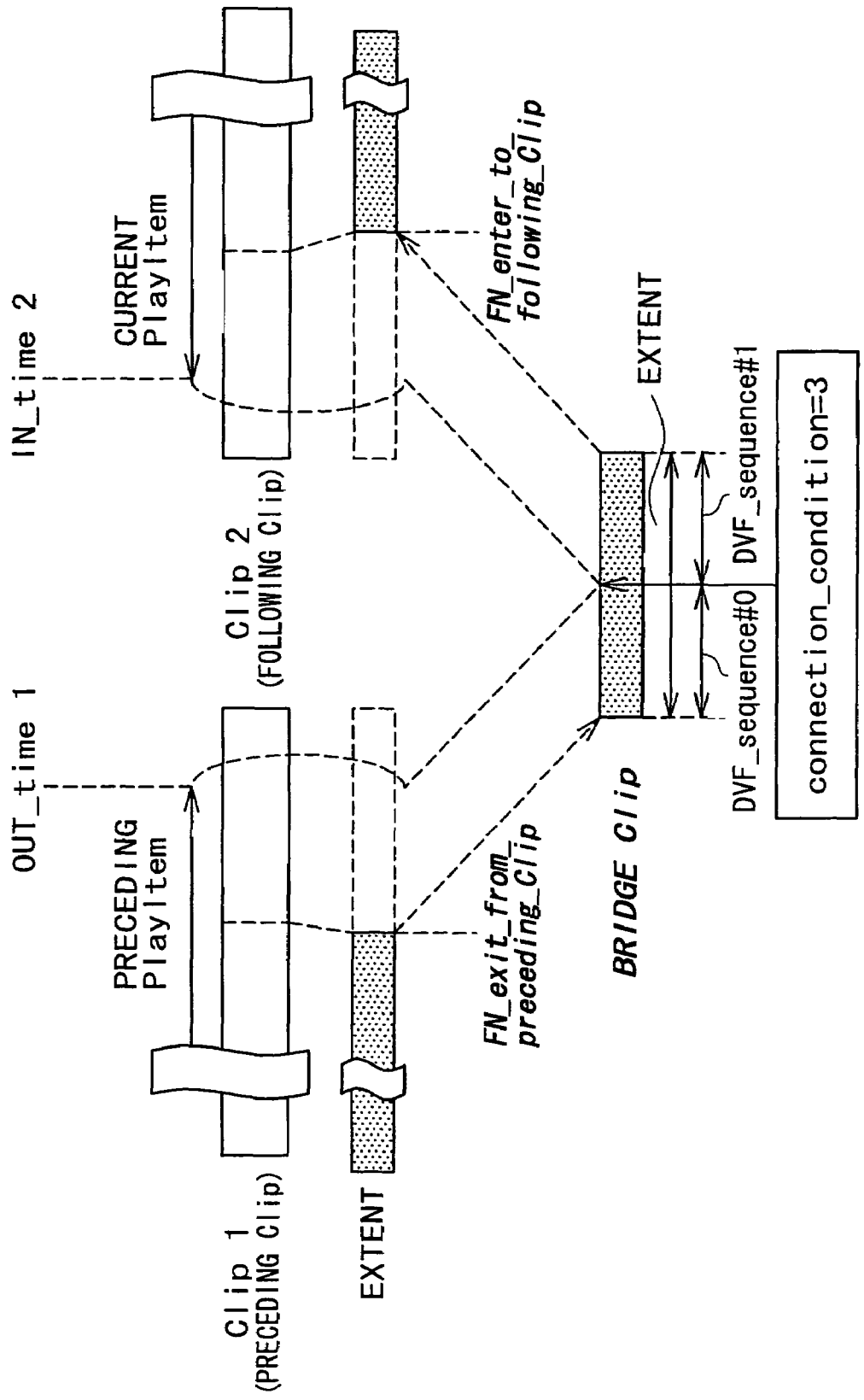

DATA RECORDING DEVICE AND METHOD, PROGRAM STORAGE MEDIUM, AND PROGRAM

TECHNICAL FIELD

The present invention relates to a data recording apparatus, a data recording method, a program storage medium, and a program. More particularly, the invention relates to a data recording apparatus, a data recording method, a program storage medium, and a program whereby data held on an information recording medium is retrieved and edited for reproduction of suitably sequenced video data in an appropriately controlled manner.

BACKGROUND ART

One way of compressing AV (Audio Visual) signals with a high degree of efficiency is so-called DV (Digital Video) method. This encoding method is disclosed illustratively in a publication "Specification of Consumer-Use Digital VCRs Using 6.3 mm magnetic tape," from The HD DIGITAL VCR CONFERENCE. The DV method has been applied primarily to camcorders (camera-integrated video tape recorders) that utilize a video cassette tape.

A DV signal is input and output through an IEEE (Institute of Electrical and Electronic Engineers) 1394 digital interface (called the IEEE 1394 interface hereunder). FIG. 1 shows a typical format of the signal passing through the IEEE 1394 interface.

The IEEE 1394 interface handles the DV signal in blocks of 80 bytes, each block being called a DIF block. A body of 150 DIF blocks makes up one DIF sequence that has a header section, a subcode section, a VAUX section, and an audio and video section. With SD-DVCR (standard TV signal standard compression mode) in effect, one video frame is constituted illustratively by 10 DIF sequences for the 525-60 system subject to the NTSC (National Television System Committee) standard, or by 12 DIF sequences for the 625-50 system subject to the PAL (Phase Alternating Line) standard. With SDL-DVCR (standard TV signal high compression mode) in effect, one video frame is formed by five DIF sequences for the 525-60 system and by six DIF sequences for the 625-50 system.

One DIF block is made up of a three-byte ID (identifier) at its top followed by a 77-byte data portion. The ID includes a DIF block type representing a section type, a sequence number denoting a color sequence, a DIF sequence number, and a DIF block number. The beginning of a DIF sequence is identified by the header section indicated by the DIF block type in the ID of a DIF block. In the DIF block of the header section, high-order three bits in the first byte are "000."

The DV signal having the above format is fed through the IEEE 1394 interface in the form of isochronous packets. The payload of an isochronous packet carrying the DV signal is called a source packet. One source packet has a fixed size of six DIF blocks (480 bytes).

FIG. 2 illustrates how DIF blocks of the 525-60 system are related to source packets. In a DV stream, all frames have their contents encoded inside and have a fixed bit rate of 120,000 bytes per frame. That means the number of source packets is fixed per video frame. The number of source packets per video frame in SD-DVCR is 250 for the 525-60 system and 300 for the 625-50 system. According to the DV standard, these DIF blocks are recorded onto a tape recording medium 6.35 mm wide.

In recent years, a number of optical disks have been proposed as a disc-type information-recordable medium that is loaded and unloaded into and out of recording/reproducing apparatuses. Each of these recordable optical disks has a mass storage capacity of up to several gigabytes and a high transfer bit rate of tens of Mbps. As such, these discs have been hailed as a promising medium for recording AV (Audio Visual) signals including video signals. In the coming years, a growing demand is expected for DV recording/reproducing apparatuses capable of recording DV signals to one of such optical disks through an IEEE 1394 interface, the signals being retrieved from the tape medium where they have been recorded by camcorder or the like.

As described above, the increasing storage capacity of a recording medium signifies growing numbers of data items (e.g., video and audio data constituting video materials) being recorded on that medium. Given numerous DV video materials recorded on a single disc, the user is required to perform editing operations so that meaningful series of desired pictures may be selected and reproduced.

Where the edited data is to be reproduced (i.e., where some of the scenes dispersed throughout the disc are to be picked up, arranged into a desired sequence, and reproduced), each scene can be reproduced obviously in seamless fashion. That is because the data representing one scene is recorded continuously on the disc. However, editing often involves putting a plurality of scenes one after another, and these scenes may or may not be reproduced seamlessly.

More specifically, an optical pickup movement and/or a disc rotational delay can occur at a connection point between scenes. At that point, the reading of data is interrupted. If the data in a read buffer have been exhausted during the interruption, data decoding is brought to a stop. This can lead to a temporary freeze of displayed pictures, disrupted audio, or other reproduction irregularities.

DISCLOSURE OF INVENTION

The present invention has been made in view of the above circumstances and provides a data recording apparatus, a data recording method, a program storage medium, and a program whereby the contents of DV video materials recorded on a recording medium are edited and reproduced in a suitably controlled manner.

In carrying out the invention and according to one aspect thereof, there is provided a first data recording apparatus for recording video data to an information recording medium, the apparatus including: a generating element which, when the video data recorded on the information recording medium is edited, generates connection information about each of a plurality of items arranged in a temporarily serial manner to form list information serving as a unit for reproducing the edited video data, each of the items designating a predetermined temporal extent of the video data; and a recording element for recording the video data, the list information, and the connection information to the information recording medium; wherein the generating element generates the connection information based on first information obtained by extracting material data that is read in accordance with the items from the video data constituted by a series of data blocks having continuous logical addresses on the information recording medium.

The first data recording apparatus may be structured either as a recording-only apparatus or as a recording processing block for use with a recording/reproducing apparatus.

The first data recording apparatus may preferably include a determining element for determining whether each of two sets of the first information which are adjacent to a connection point connecting two of the items has a data amount in excess of a predetermined amount; wherein the generating element may generate the connection information based on a result of the determination by the determining element.

The connection information may indicate either a guarantee of temporarily continuous reproduction of the edited video data, or failure of that guarantee.

If the connection information indicates the failure of the guarantee of temporarily continuous reproduction of the edited video data, then the recording element may copy the first information about the adjacent but temporarily discontinuous two items so as to generate second information and may record the second information to a blank area of the information recording medium.

The video data may have frames each with data encoded therein.

The video data may alternatively have frames each with data in a fixed amount.

According to another aspect of the invention, there is provided a first data recording method for recording video data to an information recording medium, the method including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on information obtained by extracting material data that is read in accordance with the items from the video data constituted by a series of data blocks having continuous logical addresses on the information recording medium.

According to a further aspect of the invention, there is provided a first program storage medium which stores a program for recording video data to an information recording medium, the program including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on information obtained by extracting material data that is read in accordance with the items from the video data constituted by a series of data blocks having continuous logical addresses on the information recording medium.

According to an even further aspect of the invention, there is provided a first program for recording video data to an information recording medium, the first program including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on information obtained by extracting material data that is read in accordance with the items from the video data constituted by a series of data blocks having continuous logical addresses on the information recording medium.

According to a still further aspect of the invention, there is provided a second data recording apparatus for recording video data to an information recording medium, the apparatus including: a generating element which, when the video data recorded on the information recording medium is edited, generates connection information about each of a plurality of items arranged in a temporarily serial manner to form list information serving as a unit for reproducing the edited video data, each of the items designating a predetermined temporal extent of the video data; and a recording element for recording the video data, the list information, and the connection information to the information recording medium; wherein the generating element generates the connection information based on first information obtained by extracting material data that is read in accordance with the items from the video data constituted by a series of data blocks having continuous logical addresses on the information recording medium; wherein, if the connection information indicates failure of a guarantee of temporarily continuous reproduction of the edited video data, then the recording element copies the first information about adjacent but temporarily discontinuous two of the items so as to generate second information and records the second information to a blank area of the information recording medium; and wherein, if the second information is recorded by the recording element, then the generating element changes the connection information into information indicating the guarantee of temporarily continuous reproduction of the edited video data.

The second data recording apparatus may be structured either as a recording-only apparatus or as a recording processing block for use with a recording/reproducing apparatus.

According to a yet further aspect of the invention, there is provided a second data recording method for recording video data to an information recording medium, the method including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on first information obtained by extracting material data that is read in accordance with the items from the video data constituted by a series of data blocks having continuous logical addresses on the information recording medium; wherein, if the connection information indicates failure of a guarantee of temporarily continuous reproduction of the edited video data, then the recording control step copies the first information about adjacent but temporarily discontinuous two of the items so as to generate second information and records the second information to a blank area of the information recording medium; and wherein, if the second information is recorded in the recording control step, then the generating step changes the connection information into information indicating the guarantee of temporarily continuous reproduction of the edited video data.

According to another aspect of the invention, there is provided a second program storage medium which stores a program for recording video data to an information recording medium, the program including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on first information obtained by extracting material data that is read in accordance with the items from the video data constituted by a series of data blocks having continuous logical addresses on the information recording medium; wherein, if the connection information indicates failure of a guarantee of temporarily continuous reproduction of the edited video data, then the recording control step copies the first information about adjacent but temporarily discontinuous two of the items so as to generate second information and records the second information to a blank area of the information recording medium; and wherein, if the second information is recorded in the recording control step, then the generating step changes the connection information into information indicating the guarantee of temporarily continuous reproduction of the edited video data.

According to a further aspect of the invention, there is provided a second program for recording video data to an information recording medium, the second program including the steps of: when the video data recorded on the information recording medium is edited, generating connection information about each of a plurality of items arranged in a temporarily serial manner to form list information serving as a unit for reproducing the edited video data, each of the items designating a predetermined temporal extent of the video data; and controlling the recording of the video data, the list information, and the connection information to the information recording medium; wherein the generating step generates the connection information based on first information obtained by extracting material data that is read in accordance with the items from the video data constituted by a series of data blocks having continuous logical addresses on the information recording medium; wherein, if the connection information indicates failure of a guarantee of temporarily continuous reproduction of the edited video data, then the recording control step copies the first information about adjacent but temporarily discontinuous two of the items so as to generate second information and records the second information to a blank area of the information recording medium; and wherein, if the second information is recorded in the recording control step, then the generating step changes the connection information into information indicating the guarantee of temporarily continuous reproduction of the edited video data.

Through the use of the first data recording apparatus, the first data recording method, the first program storage medium, and the first program according to the invention, when the video data recorded on the information recording medium is edited, connection information is generated about each of a plurality of items arranged in a temporarily serial manner to form list information serving as a unit for reproducing the edited video data, each of the items designating a predetermined temporal extent of the video data. The video data, the list information, and the connection information is recorded to the information recording medium. The connection information is generated based on information obtained by extracting material data that is read in accordance with the items from the video data constituted by a series of data blocks having continuous logical addresses on the information recording medium.

Through the use of the second data recording apparatus, the second data recording method, the second program storage medium, and the second program according to the invention, when the video data recorded on the information recording medium is edited, connection information is generated about each of a plurality of items arranged in a temporarily serial manner to form list information serving as a unit for reproducing the edited video data, each of the items designating a predetermined temporal extent of the video data. The video data, the list information, and the connection information are recorded to the information recording medium. The connection information is generated based on first information obtained by extracting material data that is read in accordance with the items from the video data constituted by a series of data blocks having continuous logical addresses on the information recording medium. If the connection information indicates failure of a guarantee of temporarily continuous reproduction of the edited video data, then the first information is copied about adjacent but temporarily discontinuous two of the items so as to generate second information, and the second information is recorded to a blank area of the information recording medium. If the second information is recorded, then the connection information is changed into information indicating the guarantee of temporarily continuous reproduction of the edited video data.

BRIEF DESCRIPTION OF DRAWINGS

FIG. 3 is a schematic view illustrating an application format of a simplified structure on a recording medium for use by a recording/reproducing system embodying the invention;

FIG. 4 is a tabular view indicating a syntax of a PlayList( );

FIG. 5 is a tabular view presenting a syntax of a PlayItem( );

FIG. 7 is a tabular view exhibiting syntax of a Clip information file;

FIG. 8 is a tabular view listing a syntax of DV_ClipInfo( ) included in FIG. 7;

FIG. 9 is a tabular view showing a syntax of DVF_sequenceInfo( ) included in FIG. 7;

FIG. 11 is a tabular view depicting syntax of "xxxx.rpls" and "yyyy.vpls";

FIG. 37 is a schematic view illustrating how a change is made from non-seamless connection to seamless connection by generating a bridge Clip.

BEST MODE FOR CARRYING OUT THE INVENTION

Figure 1:
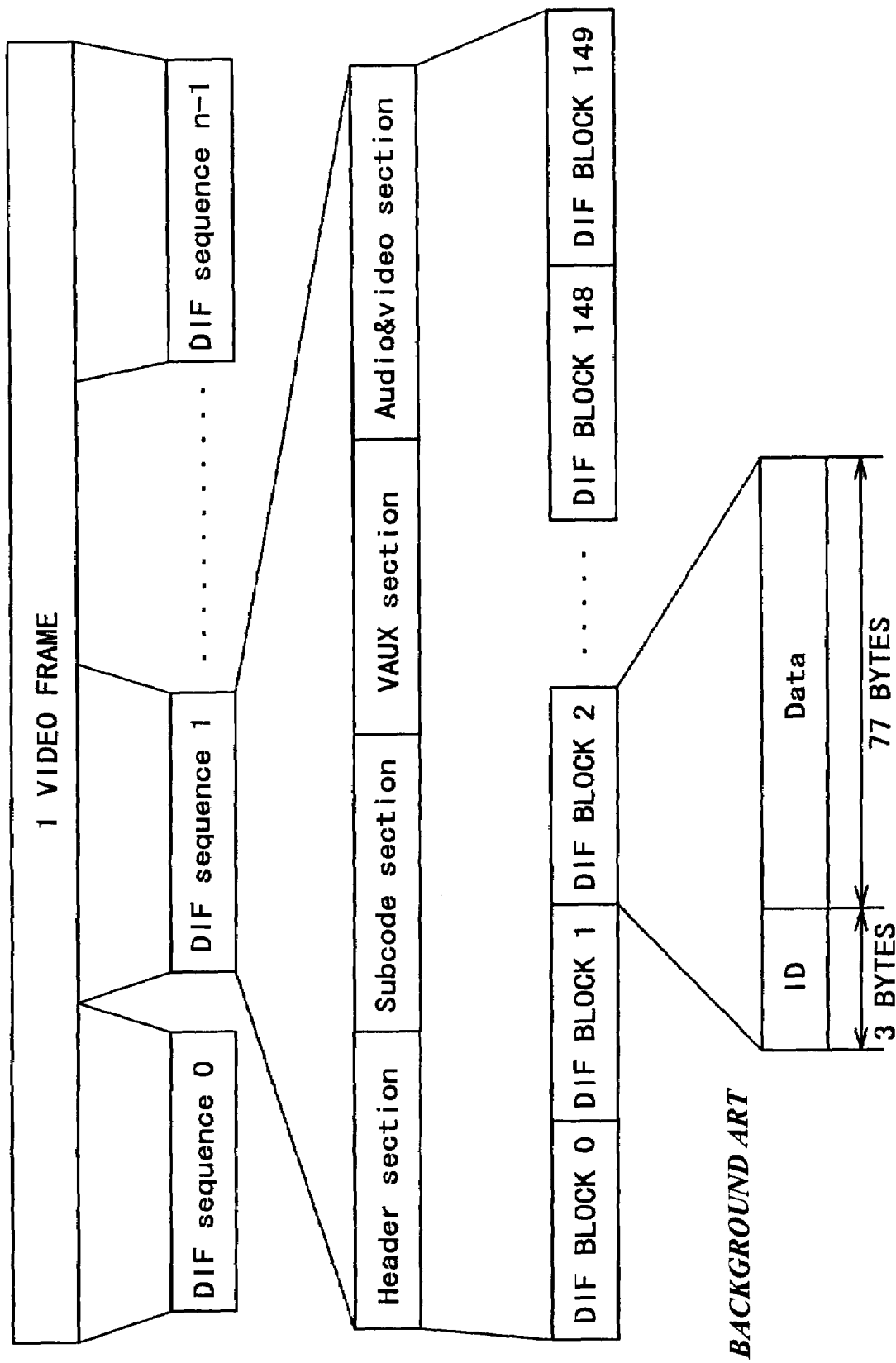
FIG. 1 is a schematic view showing a data structure of one DV video frame transferred through an IEEE 1394 interface.

In the description that follows, a Clip AV stream file refers to a body of data (video data) that is composed of digitized videos and sounds, turned into a file format processable by file systems, and recorded on a disc.

Described below is how part or all of such a Clip AV stream file is designated so that only the necessary file portions may be arranged as desired and reproduced. FIG. 3 shows an application format of a simplified structure on a recording medium (the recording medium 10 in FIG. 26, to be described later). As shown in FIG. 3, a PlayList is used to designate part or all of a Clip AV stream file so that only the desired file portions may be reproduced. From a user's point of view, a PlayList is a single integral body of videos and sounds. The simplest PlayList is formed by encompassing recorded data ranging from the start of the recording to its end. Where no editing is done, the recorded data generally make up one PlayList.

A PlayList is constituted by designation of a Clip AV stream file defining the AV stream to be reproduced, and by pairs of an IN-point (i.e., a reproduction starting point) and an OUT-point (a reproduction ending point). A complete set of the designation of a Clip AV stream file and of the pairs of an IN-point and an OUT-point each is called a PlayItem. A group of PlayItems makes up a PlayList. Reproducing a PlayItem is equivalent to reproducing that part of the Clip AV stream that is referenced by the PlayItem in question.

There are two types of PlayList: a Real PlayList and a Virtual PlayList. The Real PlayList assumes the role of presenting a Clip to the user. A Clip is usually referenced by one Real PlayList. That means the total reproduction time of Real PlayLists coincides with the total reproduction time of clips on the disc. Two or more Real PlayLists will not reference the same portion of a Clip.

A Real PlayList references exclusively part or all of a Clip. Where an AV stream is recorded as a new Clip, a Real PlayList for referencing the reproducible range of the entire Clip is automatically generated. If part of the reproducible range of the Real PlayList is deleted, that stream part of the Clip that was referenced by the deleted Real PlayList part is also deleted.

A Virtual PlayList is a PlayList that does not exclusively reference Clip data. That means a plurality of Virtual PlayLists may reference the same portion of a Clip. Where Virtual PlayLists are modified or deleted, only structure information about the Virtual PlayLists involved is updated; there is no change in the corresponding clips.

In the ensuing description, real and Virtual PlayLists may be generically and simply referred to as the PlayLists where appropriate.

A Clip AV stream is made up of recorded data representing encoded pictures and sounds. A file corresponding to the Clip AV stream on a one-to-one basis is recorded. That file (called the Clip information file hereunder) accommodates attached information for facilitating reproduction and editing. A Clip information file and the corresponding Clip AV stream are considered to make up an integral object called a Clip. In other words, a Clip is an object composed of a Clip AV stream and its attached information.

When the clips, PlayItems, and PlayLists are defined as described above to form a structure shown in FIG. 3, it is possible to designate suitably sequenced reproduction of specific file portions only without destroying the original AV stream files.

FIG. 4 illustrates syntax of a PlayList( ) to be stored into a PlayList file. A "length" field represents the length in bytes from the field immediately after this field to the end of the PlayList( ). A "PL_CPI_type" field indicates the type of a CPI (characteristic point information) possessed by this PlayList. A "number_of_PlayItems" field shows the number of PlayItems constituting this PlayList. A "number_of_Sub-PlayItems" field represents the number of PlayItem (Sub-PlayItem) for post recording.

The PlayItem( ) holds PlayItem information; the SubPlayItem( ) retains SubPlayItem information.

In this syntax, each PlayItem may have SubPlayItem only if the PlayList in question is a Virtual PlayList and if at the same time the CPI of the PlayList meets the condition shown in FIG. 4.

The SubPlayItem( ) is a structure for use in adding sounds such as post recording to the PlayList. As such, the sub-PlayItem is not relevant to this invention and thus will not be discussed further.

FIG. 5 indicates syntax of a PlayItem( ). A "length" field indicates the length in bytes from the field immediately after this field to the end of the PlayItem( ).

A "Clip_Information_file_name" field accommodates a character string representing a file name of a Clip information file (whose extension is "clpi," to be described later in connection with FIG. 10) about the Clip referenced by this PlayItem.

A "Clip_codec_identifier" field identifies an encoding method for use in generating the data constituting the Clip AV stream referenced by this PlayItem. If the data is encoded illustratively by the DV method, then this field retains a character string "DVSD" encoded as per ISO 646.

A "connection_condition" field contains information indicating the nature of connection between this PlayItem and the following PlayItem. That is, the field shows whether or not seamless connection is possible between the two PlayItems. Details of the connection condition will be discussed later.

A "ref_to_STC_id" field does not apply to DV streams. That is because the "CPI_type" is not set to 1.

An "IN_time" field gives PTS (presentation_time_stamp, a counter value on a 45 kHz counter) indicating that unique position within the Clip that represents a starting point (IN-point) of this PlayItem. An "OUT_time" field denotes that unique position within the Clip that represents an end point (OUT-point) of this PlayItem.

Figure 6:
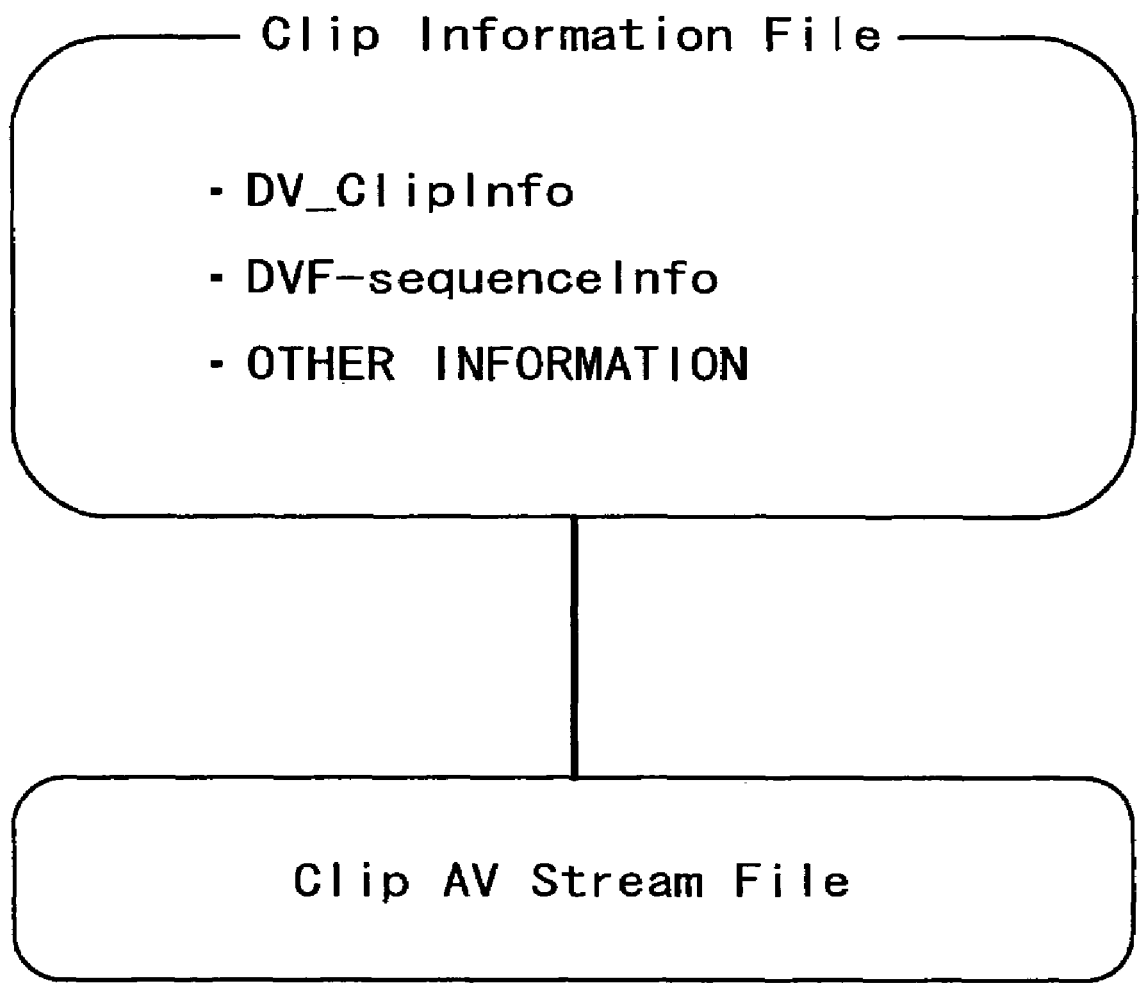
FIG. 6 is a schematic view sketching relations between a Clip information file and a Clip AV stream file.

FIG. 6 sketches relations between a Clip information file and a Clip AV stream file. The Clip information file contains attribute information and a database. The attribute information indicates the data type of the Clip AV stream file that corresponds to the Clip information file on a one-to-one basis, and the database is designed to manage time axis information about AV streams. More specifically, the Clip information file includes DV_clip information for managing data contents, and DVF-sequence information for managing time axis information about AV streams.

FIG. 7 shows syntax of a Clip information file. As shown in FIG. 7, a "DV_ClipInfo( )" block is structured to represent the attributes of the Clip as a whole, and a "DVF_SequenceInfo( )" block is furnished to accommodate DVF-sequence information for managing the time axis information about the AV stream. Although "ClipMark( )" and "MakersPrivateData( )" blocks are also structured to retain information about the Clip, these blocks are not relevant to this invention and thus will not be described further.

FIG. 8 shows syntax of a ClipInfo( ) block. A "length" field represents the length in bytes from the field immediately after this field to the end of the DV_ClipInfo( ) block. A "Clip_stream_type" field, when set to "1," indicates that the stream of the AV stream file corresponding to this Clip is a Clip AV stream containing an ordinary AV stream; when set to "2," the "Clip_stream_type" field indicates that this stream is a bridge Clip AV stream for seamless connection, to be described later. A "DV_type" field provides a byte size of one DV frame. A "DV_format_type" field may illustratively accommodate "SD-DVCR 525-60 system (120,000 bytes)," "SD-DVCR 625-50 system (144,000 bytes)," "SDL-DVCR 525-60 system (60,000 bytes)," or "SDL-DVCR 625-50 system (72,000) bytes." (The byte count in parentheses represents a single frame byte size for each system.)

FIG. 9 shows a syntax of a DVF_SequenceInfo( ) block. A "num_of_DVF_sequences" field denotes the number of DVF-sequences in the AV stream file. An "offset-frame_number[dvsq_id]" field indicates the frame number of an offset for the first DV frame in the DVF-sequence referenced by a "dvsq_id" field of the AV stream file. The frame number determines a "presentation_start_time[dvsq_id]," i.e., reproduction time of the first DV frame to be displayed from the DVF-sequence. Consecutive time stamps are then assigned to the ensuing DV frames. Suitably determining the "offset-frame_number[dvsq_id]" setting makes it possible to assign a unique time to each of the DV frames within the Clip. The reproduction times thus established are used to designate an IN_time and an OUT_time of each PlayItem. Each reproduction time is given as a count value in effect when time is counted at 45 kHz (i.e., with $1/45,000$ (sec) accuracy).

The "presentation_start_time[dvsq_id]" value is obtained using the expression (1) below:

$$\text{presentation\_start\_time}[dvsq\_id] = \text{offset\_frame\_number}[dvsq\_id] \times (45000/29.97) \quad (1)$$

A time range of a DVF sequence designated by an IN-point and an OUT-point in the "num_of_frames[dvsq_id]" field (i.e., time range corresponding to the DVF sequence for which the IN_time and OUT_time of the PlayItem( ) block are designated using "dvf_id") is given by referencing the expression (2) below:

$$\text{presentation\_start\_time}[dvsq\_id] \leq \text{IN\_time},$$
$$\text{OUT\_time} \leq \text{presentation\_start\_time}[dvsq\_id] + \text{num\_of\_frames}[dvsq\_id] \times (45000/29.97) \quad (2)$$

where, the term "num_of_frames[dvsq_id]" denotes the number of frames in the DVF-sequence referenced by "dvsq_id." This is the number of frames ranging from the first DV frame whose position is determined by a "leading_data_size[dvsq_id]" field, to the last DV frame whose position is defined by a "trailing_data_size[dvsq_id]" field.

The "leading_data_size[dvsq_id]" field denotes the number of bytes leading up to the first DV frame in the DVF-sequence referenced by "dvsq_id." The "trailing_data_size[dvsq_id]" field represents the number of bytes trailing the last DV frame in the DVF-sequence referenced by "dvsq_id."

Values of the "offset_frame_number[dvsq_id]" entered into the DVF_SequenceInfo( ) block are arranged in ascending order. That is, the "offset_frame_number[dvsq_id]"

entered into the DVF_SequenceInfo( ) block meets the conditions given by the expressions (3) and (4) below:

$$\text{offset\_frame\_number}[0] \geq 0 \quad (3)$$

$$\text{offset\_frame\_number}[dvsq\_id] > \text{offset\_frame\_number}[dvsq\_id-1] + \text{num\_of\_frames}[dvsq\_id-1] \quad (4)$$

where, 0<dvsq_id<num_of_DVF_sequences. If the DV Clip is not a Clip AV stream but a bridge Clip AV stream, then other rules apply, but details will not be discussed further.

What has been described so far is an outline of the data structure for DV recording. This data structure allows DV streams to be recorded in the form of files on a disc-like medium, and enables a PlayList to be formed by PlayItems each designated by an IN-point and an OUT-point making up a desired portion to be reproduced under proper management.

Figure 10:
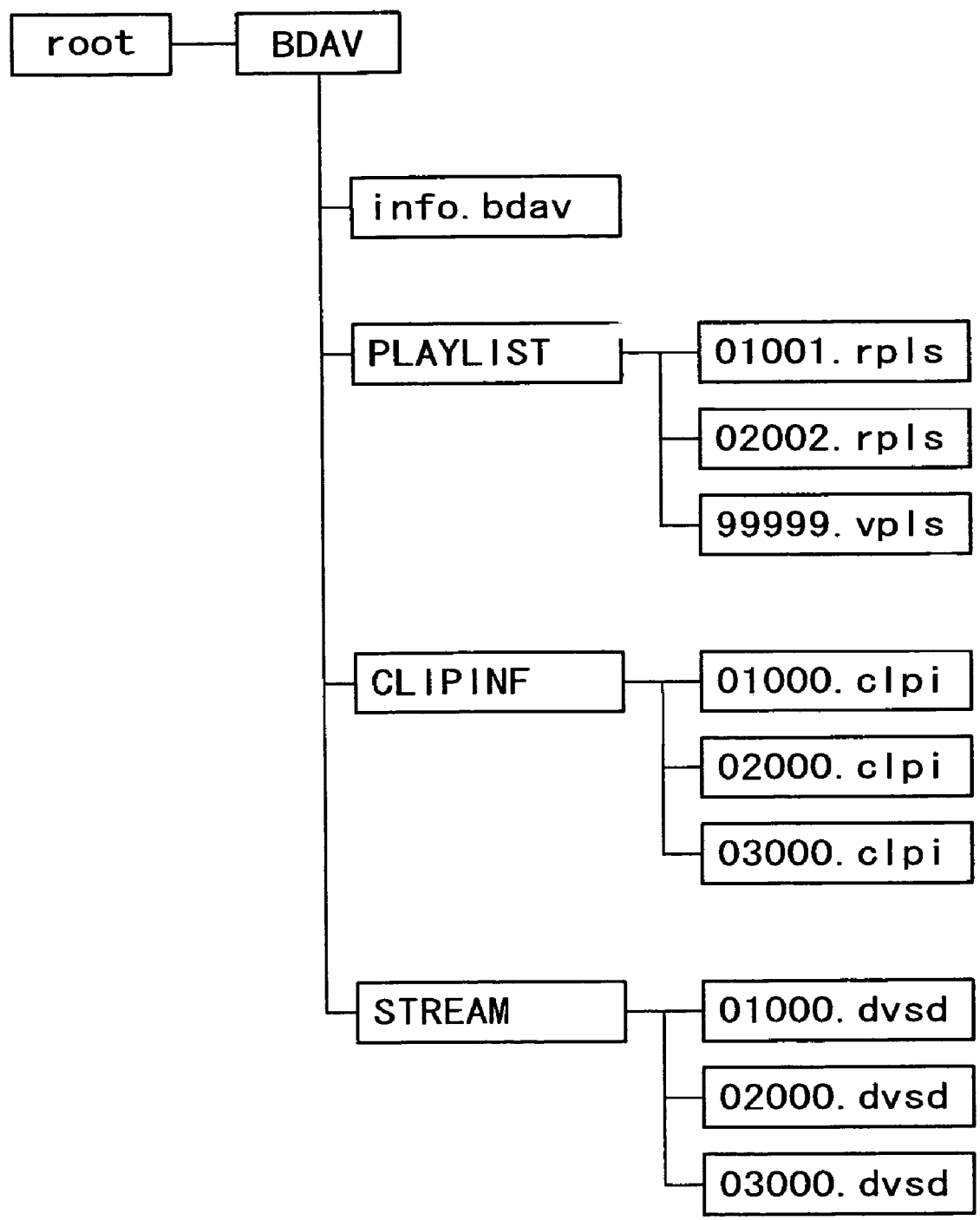
FIG. 10 is a schematic view illustrating a typical directory structure on a disc.

Described below with reference to FIG. 10 are files on a recording medium (i.e., the recording medium 10 to be discussed later with reference to FIG. 27) that allows diverse kinds of information to be written and read thereto and therefrom. A directory BDAV is first provided on the disc. Under the directory BDAV are directory files that may be managed by a single recording/reproducing system. The directory BDAV may be either a root directory on the disc or a directory under another directory.

Under the directory BDAV is placed a file named "info.bdav". Also under the directory BDAV are directories called PLAYLIST, CLIPINF, and STREAM.

Files "xxxxx.rpls" and "yyyyy.vpls" are placed under the directory PLAYLIST; files "zzzzz.clpi" come under the directory CLIPINF; and files "zzzzz.dvsd" are set under the directory STREAM.

To sum up, as shown in FIG. 10, the following files are recorded under the directory BDAV:

The first file to come under the directory BDAV is the file "info.bdav". This is a file that accommodates information about the directory as a whole.

The second files to come under the directory BDAV are the files "xxxxx.rpls" and "yyyyy.vpls" which retain PlayList information. A file with an extension "rpls" stores information about a single Real PlayList. One "xxxxx.rpls" file is prepared for each Real PlayList. The part "xxxxx" accommodates five numerals of 0 through 9 each.

A file with an extension "vpls" stores information about a single Virtual PlayList. One "yyyyy.vpls" file is prepared for each Virtual PlayList. The part "yyyyy" contains five numerals of 0 through 9 each.

The third files to come under the directory BDAV are files that accommodate Clip information, i.e., files "zzzzz.clpi" each storing attribute information about a Clip and information about a DVF-sequence (see FIG. 6). A "zzzzz.clpi" file is a Clip Information file corresponding to a single Clip AV stream file. The part "zzzzz" accommodates five numerals of 0 through 9 each.

The fourth files to come under the directory BDAV are the "zzzzz.dvsd" files each containing a Clip AV stream. The part "zzzzz" represents a unique file number of each "dvsd" file corresponding to a "clpi" file on a one-to-one basis.

There is only one file named "info.bdav" placed immediately under the directory BDAV. The inside of the file "info.bdav" is divided by function into blocks of information: a "version_number," information about the directory BDAV, information about a PlayList array, and information specific to the maker (manufacturer) of the recording/reproducing apparatus in use. The content of the file "info.bdav" is thus not relevant to this invention and will not be discussed further.

The files "xxxxx.rpls" and "yyyyy.vpls" come under the directory PLAYLIST. Each of the files has a one-to-one correspondence to each PlayList.

FIG. 11 shows how the files "xxxxx.rpls" and "yyyyy.vpls" are typically structured. The inside of each of the files is divided by function into blocks of information. More specifically, PlayList attribute information is stored in a "UIAppInfoPlayList( )" block, and information about the PlayItems constituting each PlayList is held in a "PlayList( )" block. A "PlayListMark( )" block contains mark information for setting a starting point in a PlayList and for providing the PlayList with, say, chapters for segmentation purposes. Information specific to the maker of the recording/reproducing apparatus having recorded this PlayList is stored in a "MakersPrivateData( )" block.

The top of the file has a description of a 32-bit address (e.g., PlayListMark_start_asddress) indicating the starting position of the block. This makes it possible to insert a padding_word of a desired length before or after the block in question.

The starting position of the first block "UIAppInfoPlayList( )" of the file is fixed; it is 320 bytes away from the file top.

The "UIAppInfoPlayList( )" block, "PlayListMark( )" block, and "MakersPrivateData( )" block are not relevant to this invention and thus will not be discussed further.

Figure 2:
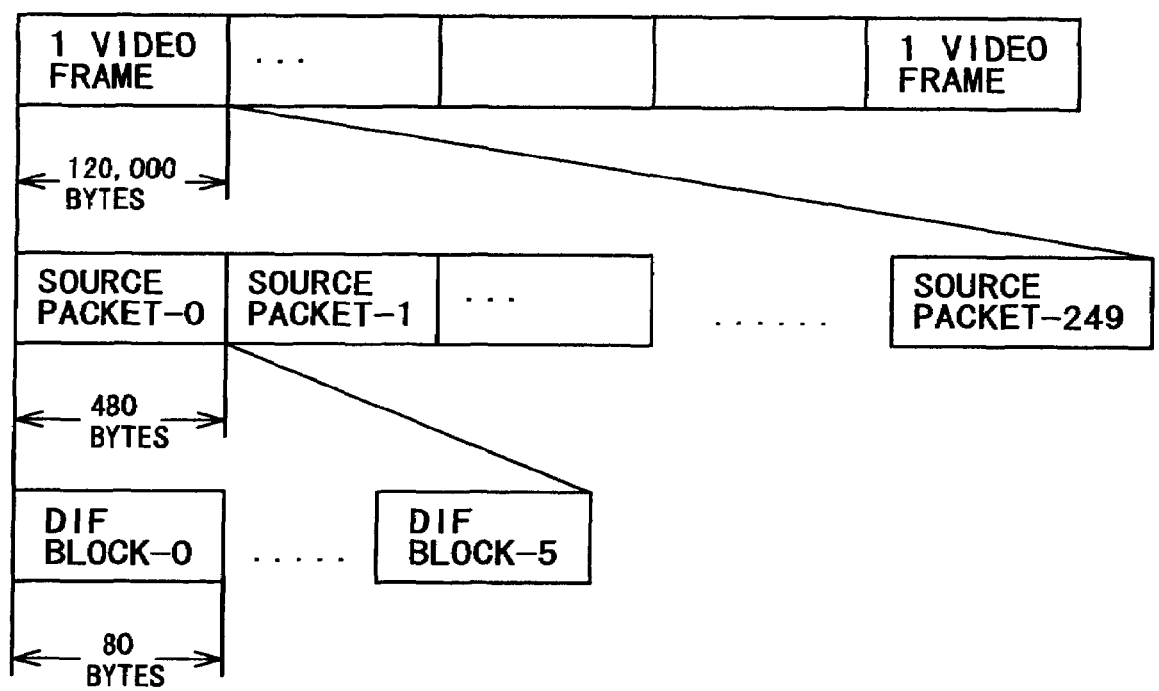
FIG. 2 is a schematic view depicting relations between source packets passing through the IEEE 1394 interface on the one hand and DIF blocks on the other hand.

Described below is a typical structure of a Clip AV stream file. The Clip AV stream file is recorded one video frame at a time (see FIG. 2) in the DV signal format passing through the IEEE 1394 interface.

Figure 12:
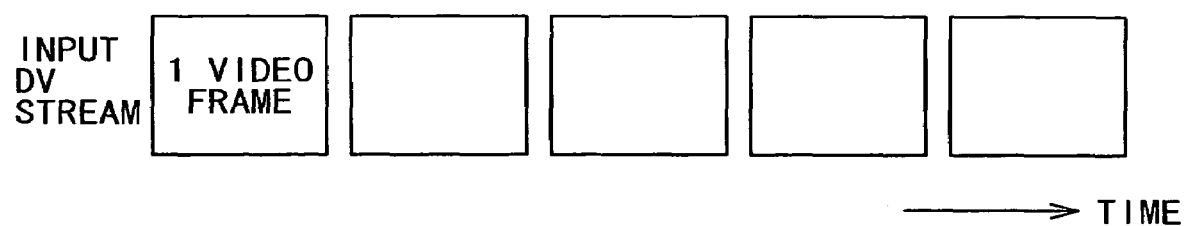
FIG. 12 is a schematic view indicating a DV stream that is input so as to record anew to a recording medium.
Figure 13:
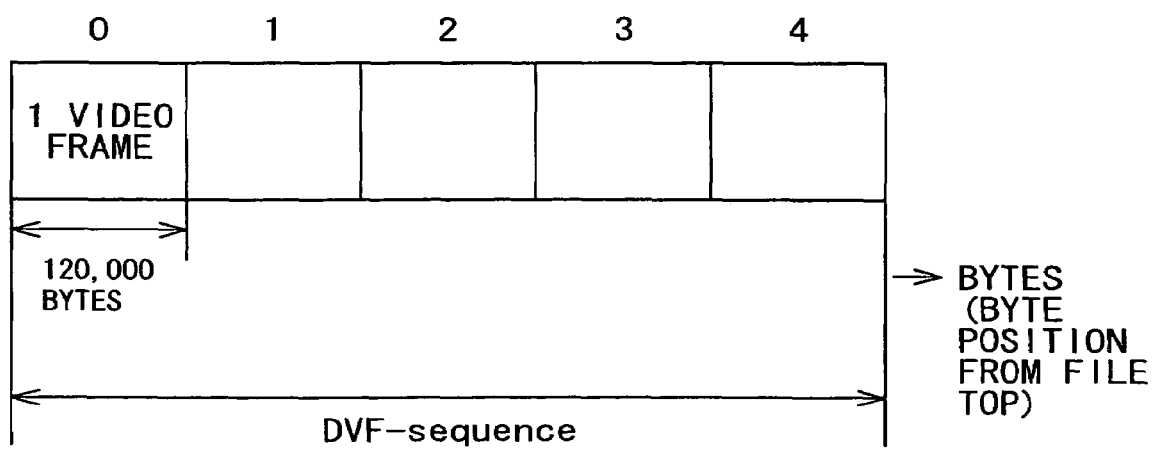
FIG. 13 is a schematic view presenting a typical structure of a Clip AV stream file generated when the DV stream of FIG. 12 is recorded anew to the recording medium.

Suppose that as shown in FIG. 12, a DV stream is input frame by frame to be recorded anew to a recording medium. In that case, the input DV frame data is aligned as illustrated in FIG. 13 into a logically continuous byte sequence and recorded as such. (In the example of FIG. 13, what is recorded is a byte sequence of frames having frame numbers of 0, 1, 2, 3, and 4.)

Figure 14:
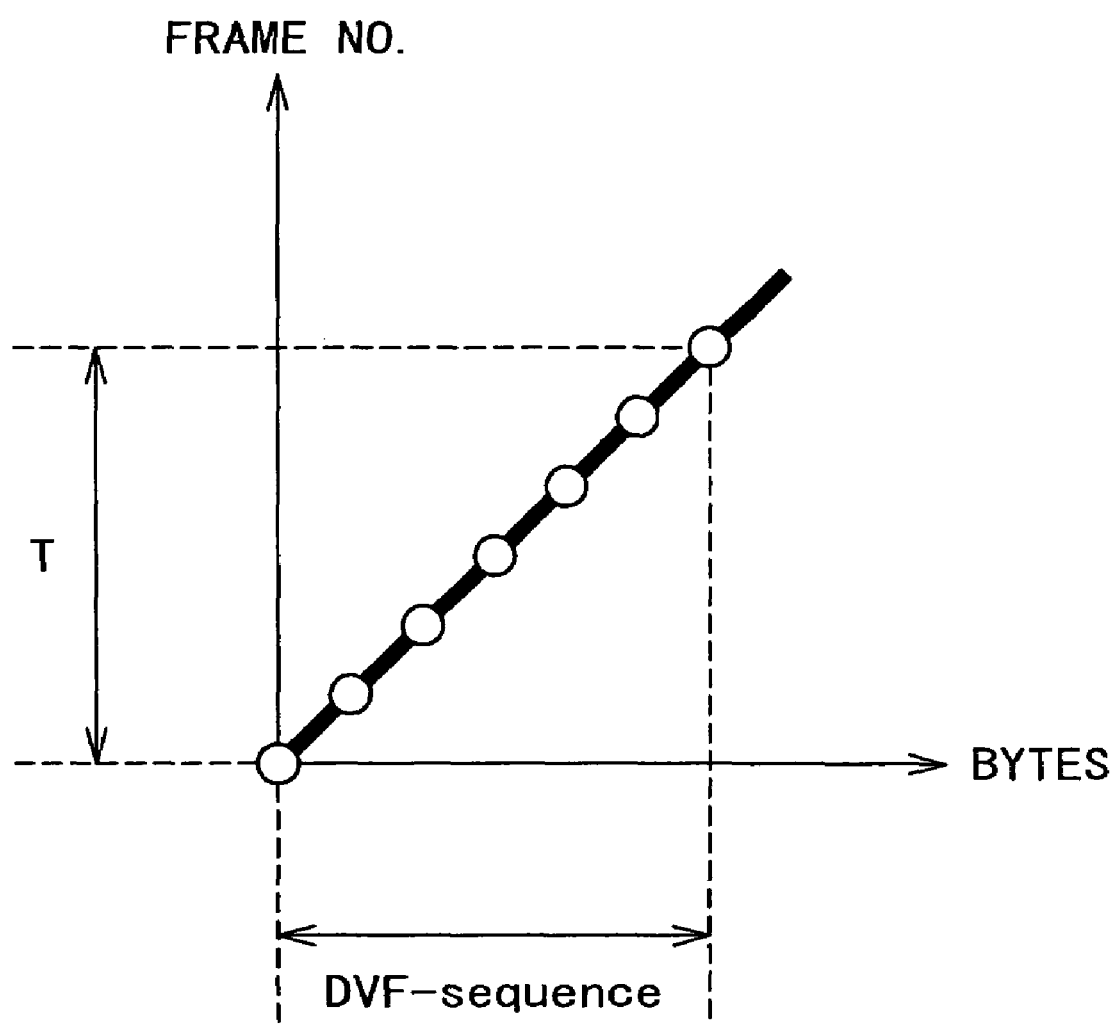
FIG. 14 is a graphic representation of a DVF-sequence.

FIG. 14 gives a graphic representation for explaining the DVF-sequence in FIG. 13. The horizontal axis indicates byte positions relative to the top of the file, and the vertical axis denotes frame numbers. When a DV stream made up of DV frames is recorded anew to the recording medium as shwon in FIGS. 12 and 13, frame numbers are assigned to the DV frames in the order which they are recorded. Such a byte sequence of continuous DV frames having consecutive frame numbers in an AV stream file is called a DVF-sequence. In the example of FIG. 13, the byte sequence composed of five frames with frame numbers 0 through 4 constitutes a single DVF-sequence. (In a time period T in FIG. 14 corresponding to one DVF-sequence, the frame numbers are seen continuous.) When a DV stream is recorded anew to the recording medium, the Clip of the stream has only one DVF-sequence and does not include any discontinuity of DV frame numbers.

Figure 15:
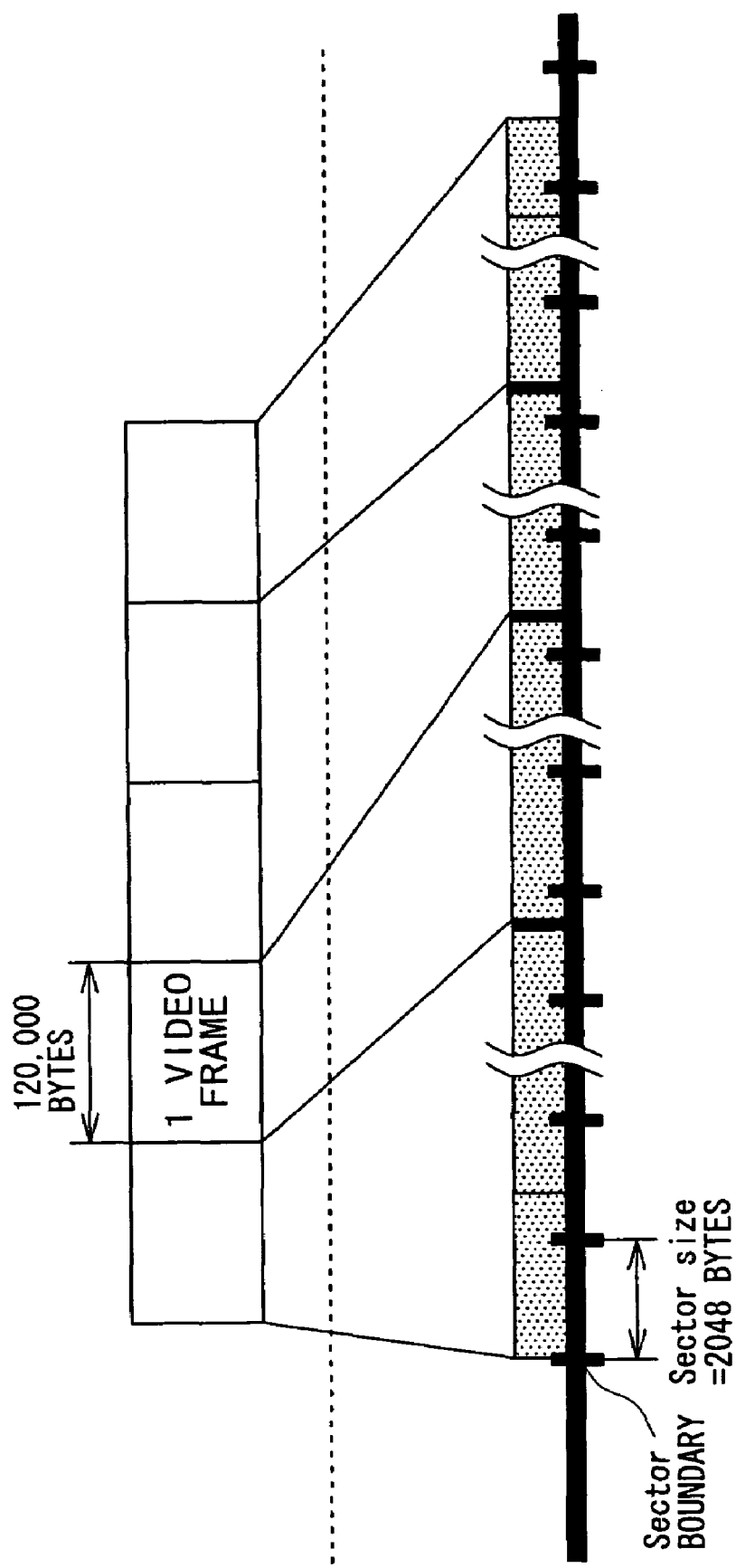
FIG. 15 is a schematic view sketching an array of data constituting a Clip AV stream file on a disc, the file being generated when a DV stream is recorded anew to a recording medium.

With a file system, its data is recorded and reproduced in units of logical blocks called sectors. Likewise, DV streams are recorded and reproduced in units of sector multiples. For that reason, as shown in FIG. 15, an AV stream file when recorded anew has the top of its DVF-sequence aligned with a sector boundary. The upper part of FIG. 15 shows a DVF-sequence in effect when an AV stream file is recorded anew, and the lower part of FIG. 15 indicates a typical data array recorded on the recording medium.

Each of the sectors typically has a size of 2,048 bytes, whereas one DV frame with a data size of 120,000 bytes is not a multiple of the 2,048 bytes. That means the starting byte of frame data other than the frame data of the file top does not necessarily coincide with a sector boundary. As a result, partial data erasure of an AV stream file in units of frames may actually require deleting sector-long data.

Figure 16:
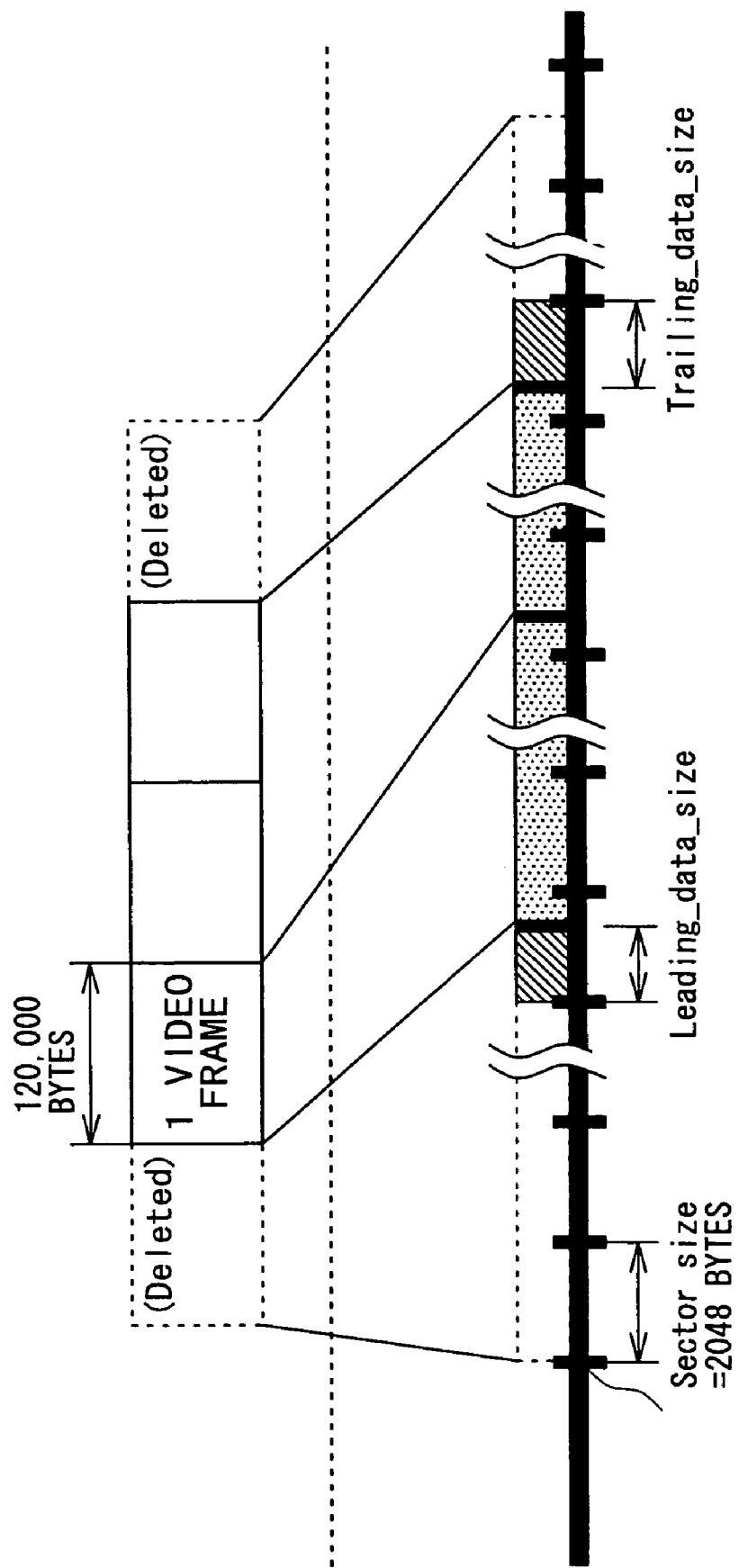
FIG. 16 is a schematic view exhibiting an array of data constituting the Clip AV stream file in FIG. 15, with part of the original file data deleted.

FIG. 16 depicts a data array on the disc where data at the beginning and the end of the DVF-sequence in FIG. 15 are partially deleted. More specifically, data is deleted in such a manner that the top of the DVF-sequence is aligned with a sector boundary (i.e., data is deleted sector by sector). This leaves the first complete DV frame preceded by incomplete frame data (data from the deleted frame) whose size is indicated by the "Leading_data_size" field. Furthermore, data is deleted in such a manner that the end of the DVF-sequence is aligned with another sector boundary. This leaves the last complete DV frame followed by incomplete frame data (data from the deleted frame) whose size is denoted by the "Trailing_data_size" field.

Described below is how Clip AV stream data is partially deleted and a plurality of DVF-sequences are generated as a result.

Figure 17:
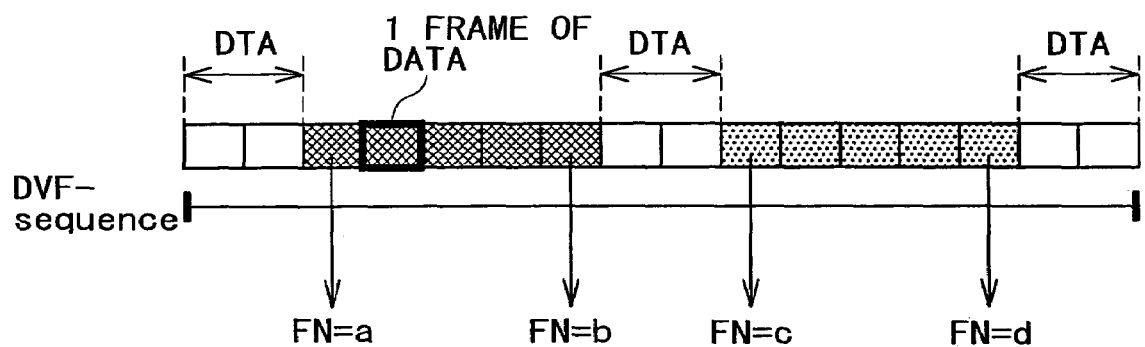
FIG. 17 is a schematic view showing a DVF-sequence generated when a DV stream is recorded anew to a recording medium.
Figure 18:
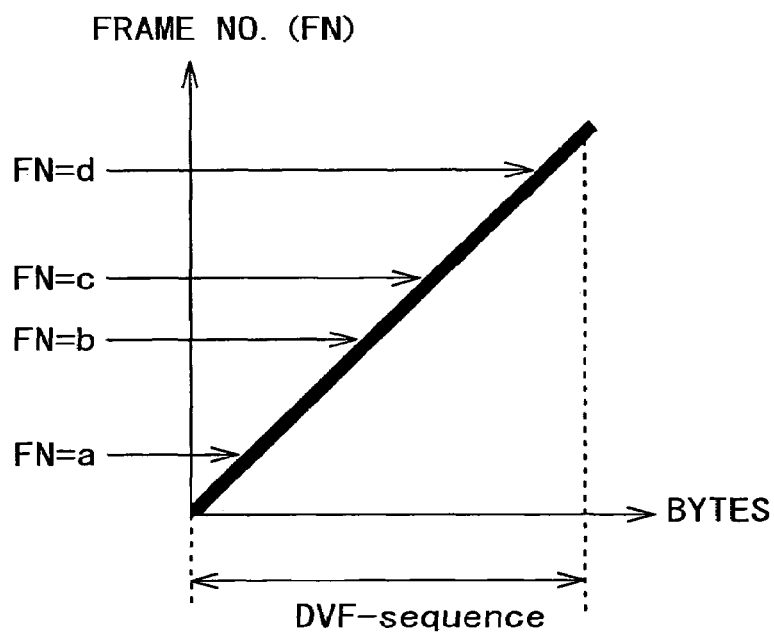
FIG. 18 is a graphic representation describing frame numbers applicable to the DVF-sequence in effect when the DV stream of FIG. 17 is recorded anew to the recording medium.

FIG. 17 shows a DVF sequence formed when a DV stream is recorded anew to a recording medium. Suppose that in the example of FIG. 17, a segment ranging from frame number FN=a to frame number FN=b and a segment from frame number FN=c to frame number FN=d are left undeleted for reproduction, with the rest of the data erased as unnecessary. FIG. 18 (corresponding to FIG. 14) indicates the frame numbers (FN) of the DVF-sequence in FIG. 17 in effect before data erasure. In this case, the frame numbers of the DVF-sequence are determined in proportion to the byte numbers of the sequence.

Figure 19:
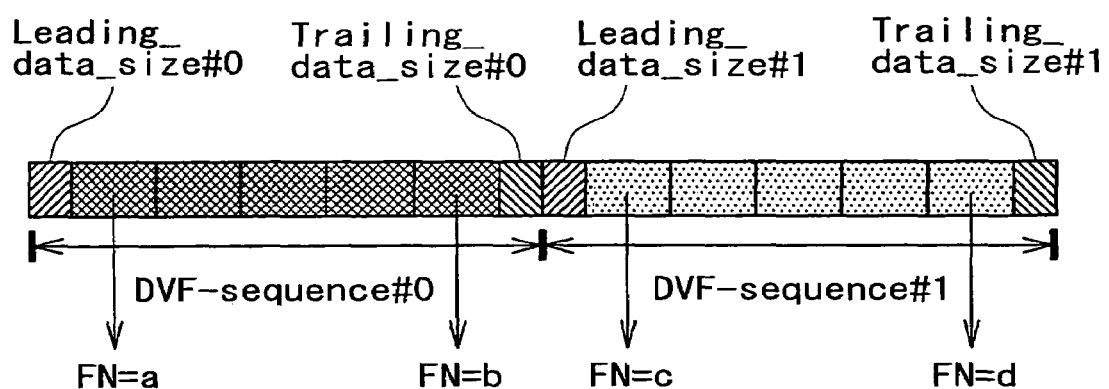
FIG. 19 is a schematic view depicting DVF-sequences derived from the DVF-sequence in FIG. 17, with part of the original sequence deleted.

FIG. 19 depicts what happens after the unnecessary data have been deleted from the example of FIG. 17, leaving the segment ranging from frame number FN=a to frame number FN=b and the segment from frame number FN=c and frame number FN=d undeleted for reproduction. After this editing, two DVF-sequences are formed in the Clip (FIG. 19). The first DVF-sequence (DVF-sequence #0 in FIG. 19) includes frame data of the reproduction segment ranging from frame number FN=a to frame number FN=b, and the second DV-sequence (DVF-sequence #1 in FIG. 19) contains frame data of the reproduction segment from frame number FN=c and frame number FN=d.

Figure 20:
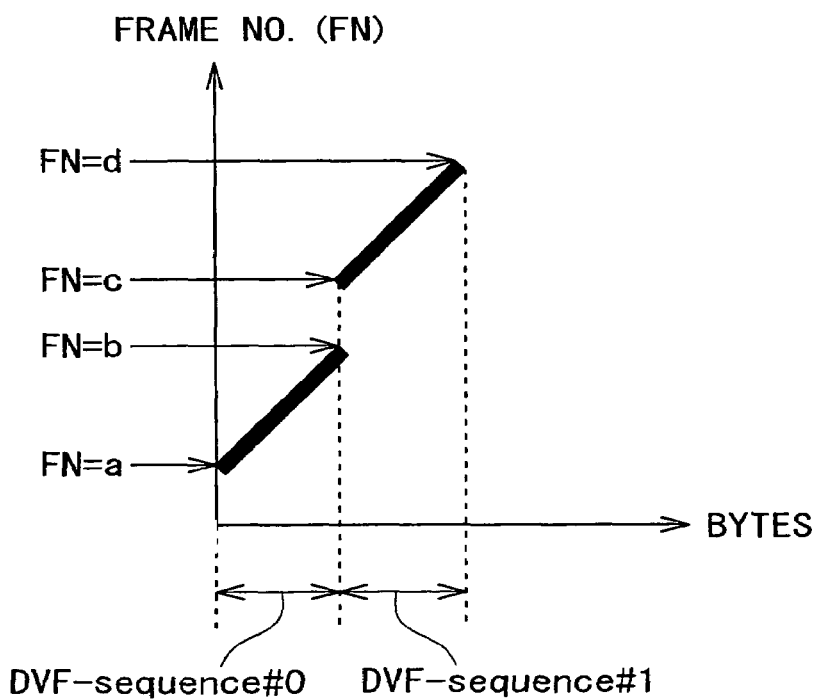
FIG. 20 is a graphic representation indicating frame numbers applicable to the DVF-sequences obtained by deleting part of the DVF-sequences in FIG. 19.

FIG. 20 shows the frame numbers (FN) of the DVF-sequences in FIG. 19. In this case, frame numbers are discontinuous across the boundary between the two DVF-sequences. As indicated in FIG. 19, the DVF-sequence #0 has its data delimited by "Leading_data_size#0" and "Trailing_data_size#0," and the DVF-sequence #1 by "Leading_data_size#1" and "Trailing_data_size#1."

What follows is a description of relations between a DVF-sequence and a PlayList in effect when Clip AV stream data is partially deleted (edited) as described above.

Figure 21:
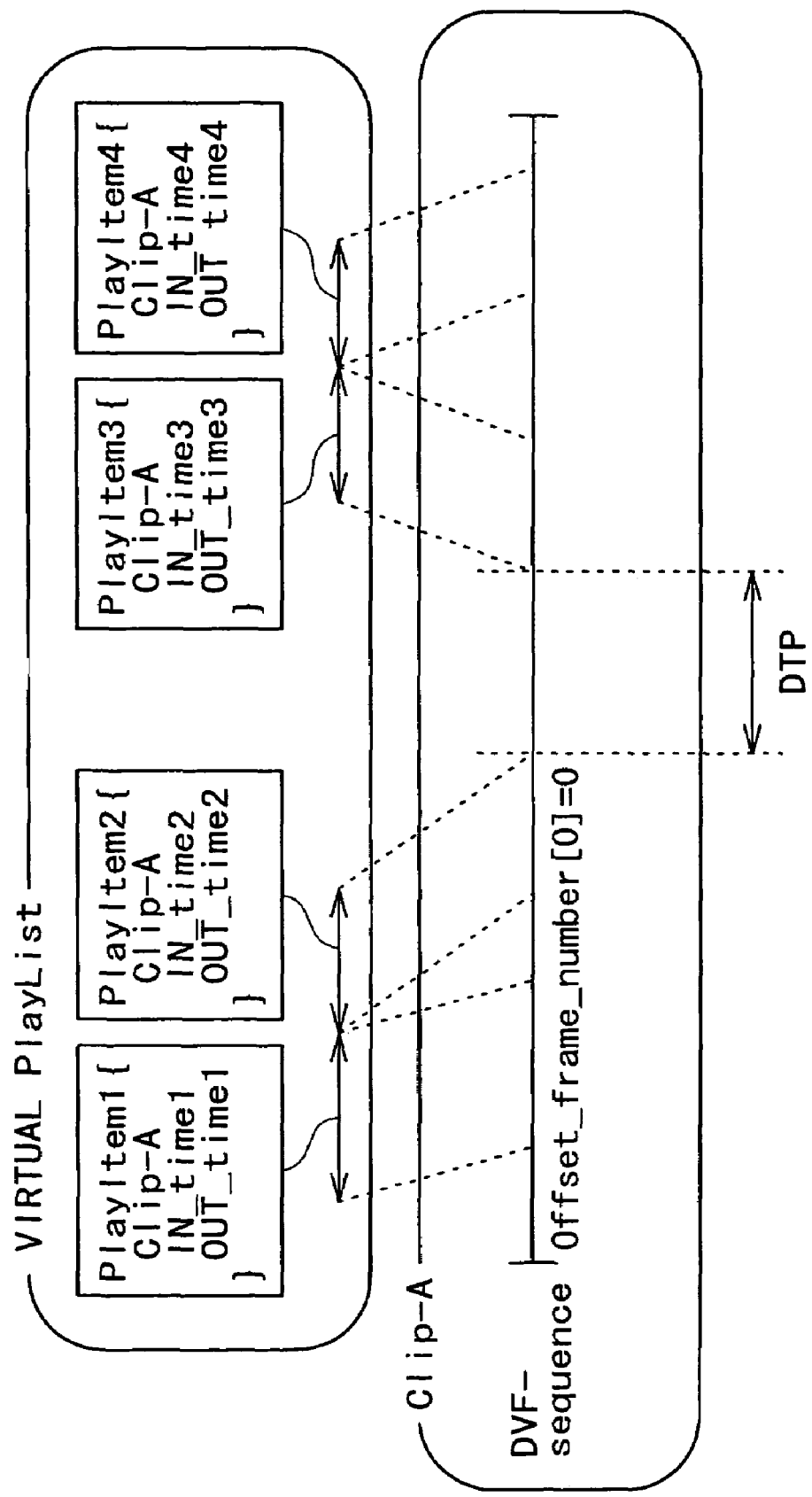
FIG. 21 is a schematic view presenting relations between a Clip and a PlayList in effect before part of a Clip AV stream is deleted.

Consider the case of FIG. 21 in which a portion DTP is deleted from a Clip AV stream having one DVF-sequence. As shown in FIG. 21, an "Offset_frame_number[0]" of the unedited DVF-sequence (i.e., frame number of the offset for the first frame of this DVF-sequence) is zero. Suppose that the DVF-sequence is referenced by a PlayItem1, a PlayItem2, a PlayItem3, and a PlayItem4 of a Virtual PlayList and that, as depicted in FIG. 21, the data constituting the AV stream data portion not referenced by any one of the PlayItems is deleted from the DVF-sequence.

Figure 22:
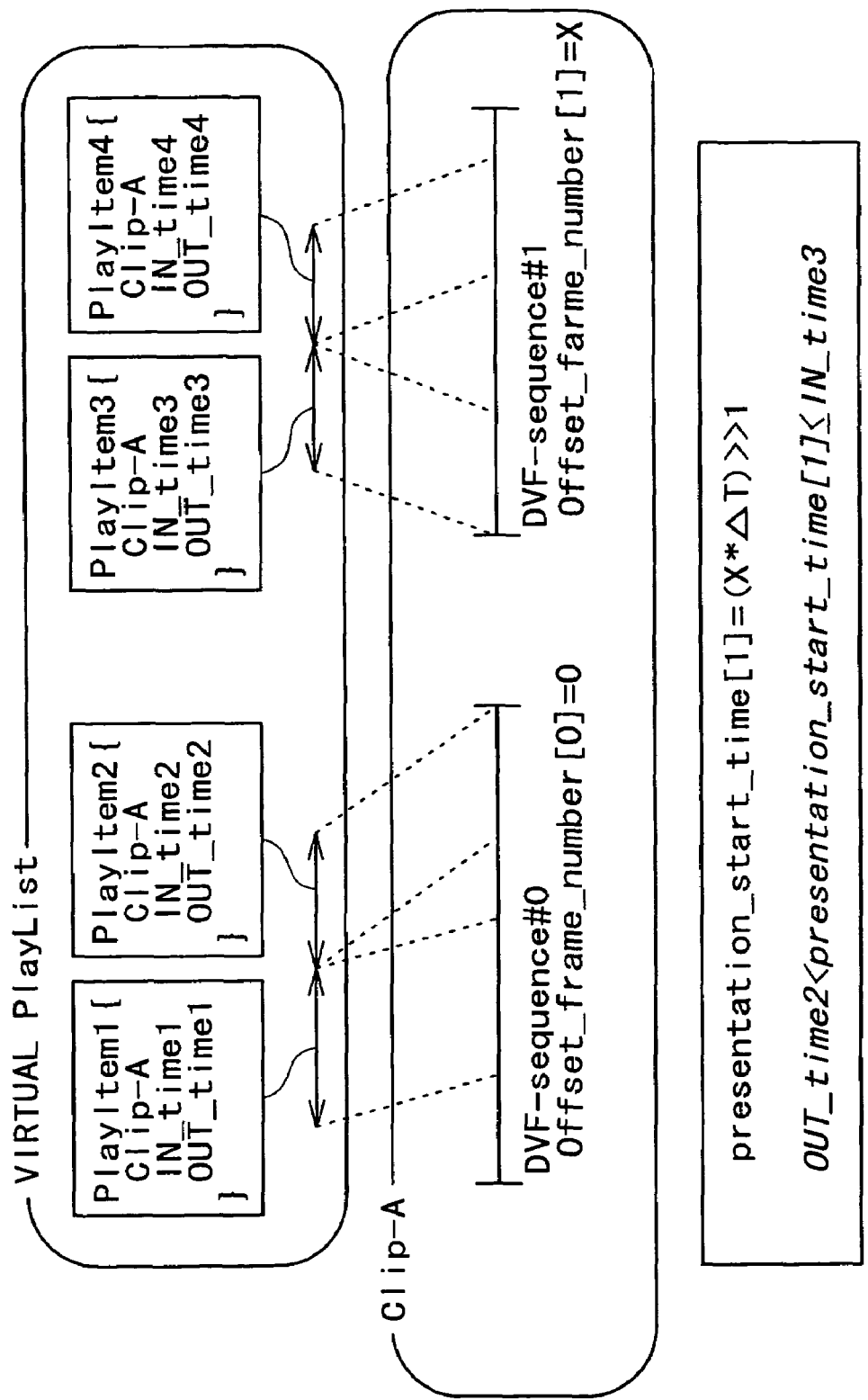
FIG. 22 is a schematic view picturing relations between the Clip and the PlayList in effect after that part of the Clip AV stream that was selected in FIG. 21 has been deleted.

When the portion DTP of the Clip AV stream is deleted as shown in FIG. 21, the DVF-sequence is split into a DVF-sequence #0 and a DVF-sequence #1 as illustrated in FIG. 22. That is, the edited Clip has two DVF-sequences. The "Offset_frame_number[0]" for the first DVF-sequence is set to zero, and the "Offset_frame_number[1]" for the second DVF-sequence is set to a value X. A "presentation_start_time[1]" obtained by converting the frame number X into time is greater than "OUT_time2" of the PlayItem2, and is equal to or less than "IN_time3" of the PlayItem3. That means there is no need to change the "IN_time" and "OUT_ime" values of the PlayItem3 and PlayItem4 in the Virtual PlayList after the editing. Where Clip AV stream data is partially deleted, those items of the Virtual PlayList that do not use the deleted portion need not be changed.

When a PlayList is to be reproduced, a reproduction unit of the apparatus compares the "IN_times" of the PlayItems with the "presentation_start_time" obtained by converting the "Offset_frame_number[n]" of DVF-sequences into time, in order to find the DVF-sequence pointed to by the "IN_time" and "OUT_time." For example, in the case of FIG. 22, the "IN_time3" of the PlayItem3 is greater than the "presentation_start_time[1]" acquired from the "Offset_frame_number[1](=X) of the second DVF-sequence, so that the "IN_time3" and "OUT_time3" of the PlayItem3 are found pointing to the second DVF-sequence.

Explained below is the information indicating the status of reproduction at a connection point between PlayItems, which is one of the features that characterize this invention. The information in question is "connection_condition" included in files "#####.rpls" and "#####.vpls" containing PlayList information.

Desired scenes of a DV stream may be connected using PlayItems as follows:

The encoding method adopted for DV has no provision for differentiating frames by code (i.e., all frames are regarded as intra-frames, each frame having its content encoded within). That means the DV stream, even after being cut off or connected in units of frames, remains continuous when decoded.

That is, the condition of continuity at a connection point of DV (condition for seamless reproduction) involves determining whether the speed of reading data from the disc near the connection point of interest keeps up with decoding speed, i.e., whether or not continuous data feed is ensured. The same data content may or may not be supplied continuously depending on where the data is located on the disc. Thus whether or not continuous data feed is available comes down to the problem of data layout on the disc under management of the file system layer; the availability of continuous data feed cannot be determined solely by the IN-points and OUT-points of PlayItems in the application layer. This requires establishing a dedicated field in the application layer and recording connection point-related information to that field. The distinction between seamless reproduction (with continuous data feed available) and non-seamless reproduction (with continuous data feed unavailable) is designated by the "connection_condition" field.

The "connection_condition" field may take one of three values, 1, 3 or 4 with regard to a DV stream. When set to 1, the "connection_condition" field represents non-seamless reproduction; when set to 3, the field denotes seamless reproduction using a bridge sequence along with a Virtual PlayList; when set to 4, the field stands for seamless reproduction without recourse to a bridge sequence. The field settings and their meanings are discussed below in more detail.

First to be described is the case where the "connection_ondition" field is set to 1. This means that seamless reproduction is not guaranteed between the PlayItem of interest (i.e., the current PlayItem having this "connection_ondition" field) and the preceding PlayItem in reproduction order.

Figure 23:
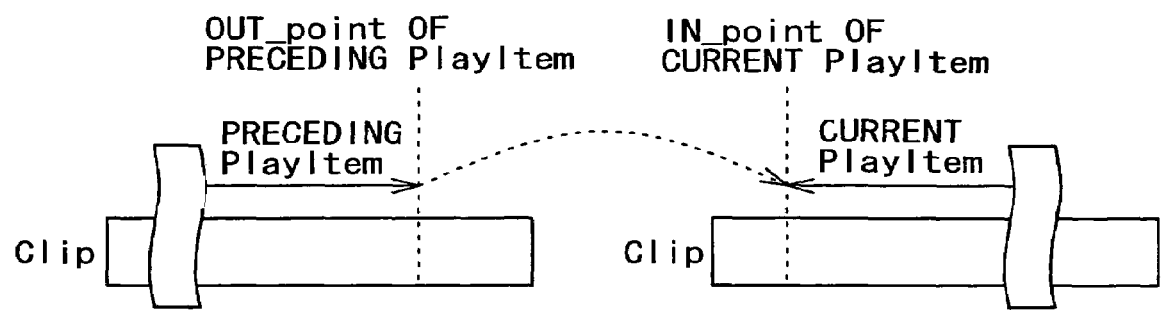
FIG. 23 is a schematic view sketching a typical connection in effect when a "connection_condition" value is set to "1"

The situation above can occur when a connection is designated by simply establishing an OUT-point and an IN-point without suitably rearranging data. In the example of FIG. 23, seamless reproduction is not guaranteed because the IN-point of the current PlayItem and the OUT-point of the preceding PlayItem are simply set for a connection, with no other considerations. The same applies in the example of FIG. 24 where the OUT-point of the preceding PlayItem and the IN-point of the current PlayItem exist in the same Clip. The value 1 is the default for all connections with no checks made on whether or not seamless reproduction is available.

More specifically, the "connection_condition" field being set to 1 signifies not only connections where seamless reproduction is unavailable but also cases where seamless reproduction is possible but not explicitly guaranteed. For example, even if the "connection_condition" field is set to 1, the reproducing apparatus may find the connection in question to be seamless and proceed with seamless reproduction provided the following two conditions are met:

First, the OUT-point of the preceding PlayItem should coincide with the IN-point of the current PlayItem (the PlayItem of interest).

Second, the OUT-point of the preceding PlayItem and the IN-point of the current PlayItem should exist in the same DVF-sequence.

Figure 25:
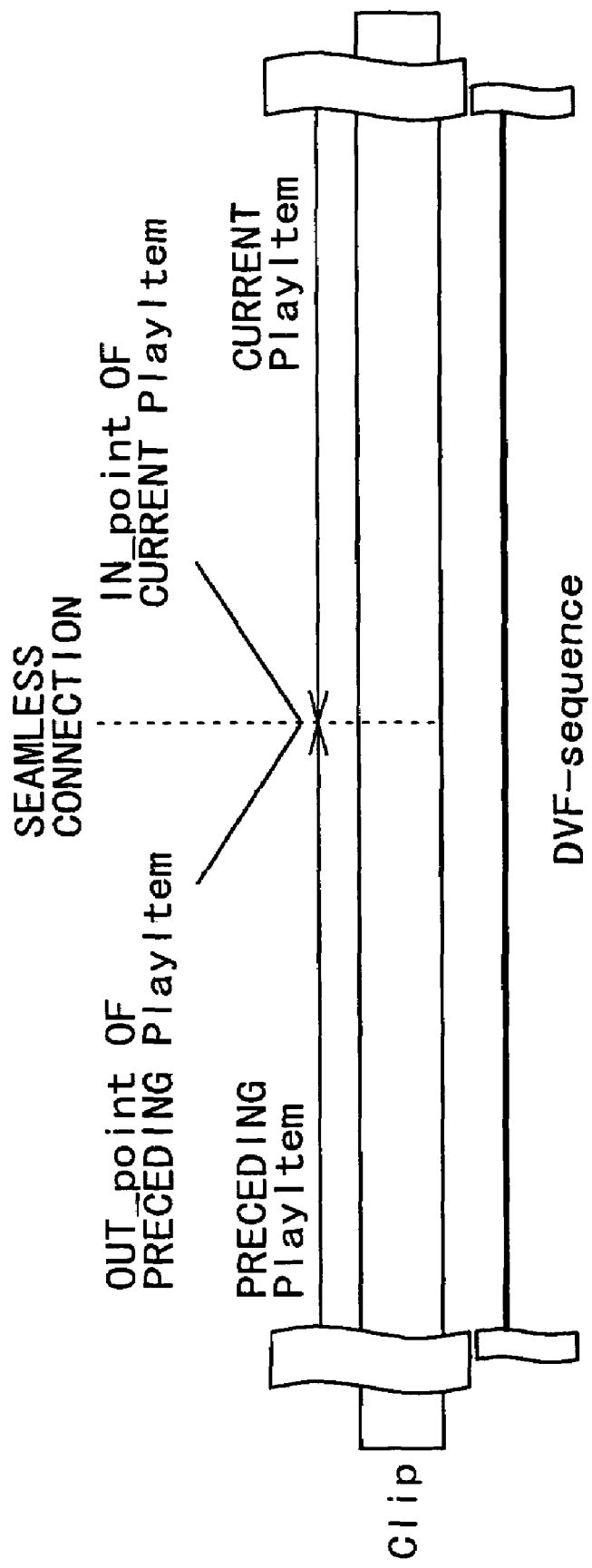
FIG. 25 is a schematic view showing a typical connection whereby seamless reproduction is made possible.

FIG. 25 shows a typical connection that meets the above two conditions. In this example, the OUT-point of the preceding PlayItem is seen coinciding with the IN-point of the current PlayItem, and the OUT-point of the preceding PlayItem and the IN-point of the current PlayItem are found in the same DVF-sequence. This is a seamless connection that results automatically in seamless reproduction.

Next to be described are cases where the "connection_ondition" field is set to 3 or 4. These values indicate that the current PlayItem connects seamlessly with the preceding PlayItem. The "connection_condition" field is set to 3 or 4 when, with data suitably laid out, a sufficient amount of data is accumulated in the buffer for read out (by a buffer 14 in FIG. 26, to be described later) so that the interruption of a read operation by the disc drive apparatus at the connection point is compensated by continuous feed of the buffered data to a decoder (DV decoder 15 in FIG. 26).

Figure 26:
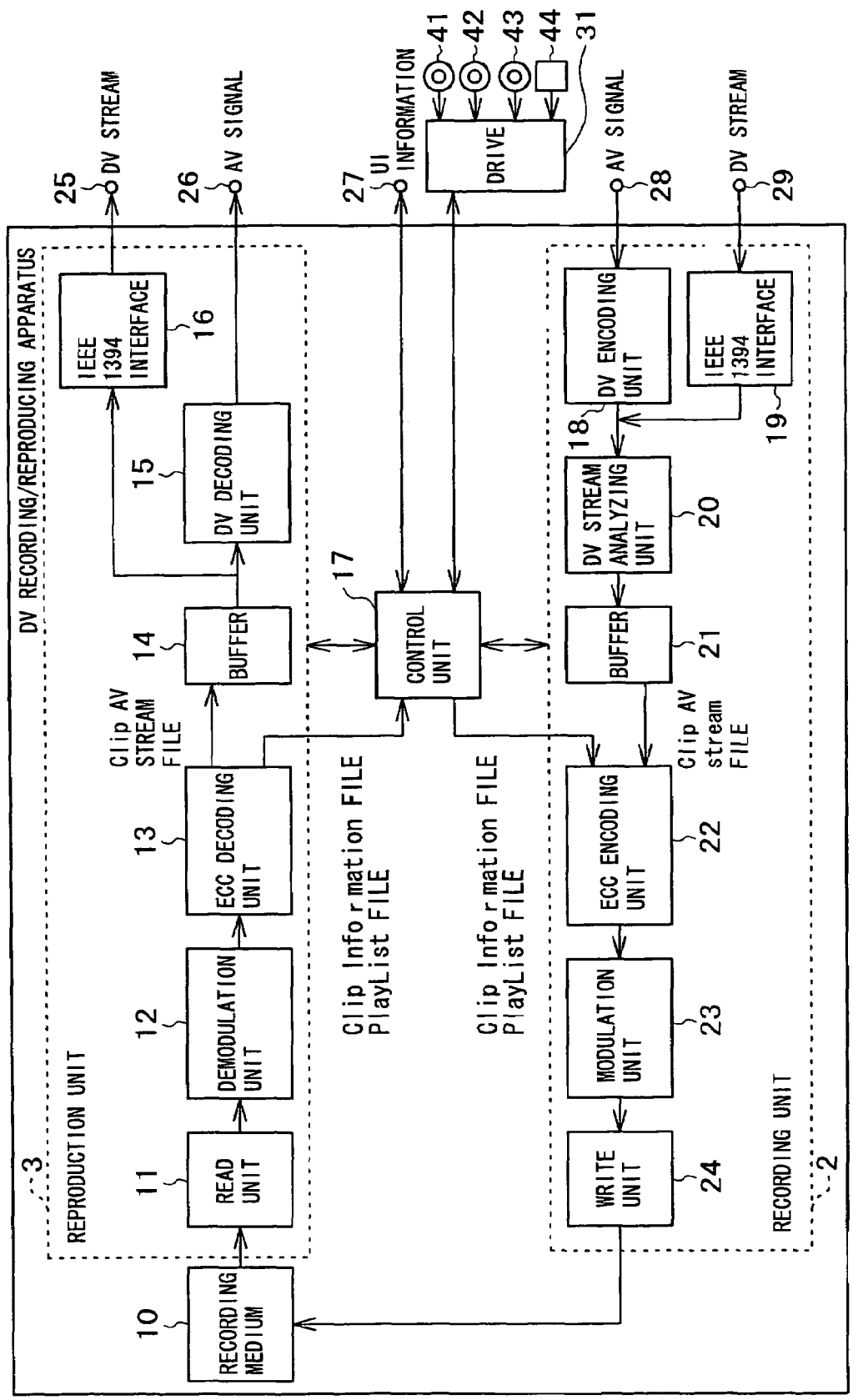
FIG. 26 is a block diagram giving a typical structure of a DV recording/reproducing apparatus embodying the invention.

A system for recording and reproducing data in a DVR application structure will now be described with reference to the block diagram of FIG. 26 showing a typical structure of a DV recording/reproducing apparatus 1. The apparatus 1 includes a recording unit 2 for performing recording processes and a reproduction unit 3 for carrying out reproduction processes.

The recording process is described below. A DV stream is acquired in one of two ways. Either the stream is obtained by having a DV encoding unit 18 encodes an AV signal input from a terminal 28, or the stream is received through an IEEE 1394 interface 19 from a terminal 29. After analysis by a DV stream analyzing unit 20, the DV stream is input to an ECC (error-correcting code) encoding unit 22 and a modulation unit 23 whereby the stream is supplemented with ECC and modulated. The DV stream thus processed is input to a write unit 24. In keeping with control signals sent from a control unit 17 to the recording unit 2, the write unit 4 writes an AV stream file to a recording medium 10.

Besides recording the AV stream file, the DV recording/reproducing apparatus 1 records application database information generated by the control unit 17 about the file in question. Two kinds of information are input to the control unit 17: information from the DV stream analyzing unit 20, and user-designated information input through a terminal 27.

The information from the DV stream analyzing unit 20 includes: a DV signal type (DV_type), an input DV frame count, and program information. The number of frames counted at the end of the DV stream recording operation is the number of frames in the DVF-sequence (num_of_frames). Information about changes in the program content of the AV stream is stored into "ProgramInfo." The information coming from the DV stream analyzing unit 20 is stored into an AV stream database (Clip information).

The user-designated information input through the terminal 27 includes: information for designating reproduction segments in the AV stream, characters that explain the content of the segments, bookmarks to be set in user-designated scenes, and time stamps for resume points in the AV stream. These items of user-designated information are stored into a PlayList database.

On the basis of the input information described above, the control unit 17 generates the AV stream database (Clip information), PlayList database, and management information (file "info.bdav") about recorded contents on the recording medium 10. As with the AV stream, the database information is processed by the ECC (error-correcting) encoding unit 22 and modulation unit 23 before being input to the write unit 24. The write unit 24 writes database files to the recording medium 10 in accordance with control signals supplied by the control unit 17.

The reproducing process will now be described. The recording medium 10 has AV stream files and application database information recorded thereon. The control unit 17 first instructs a read unit 11 to read application database information. In response, the read unit 11 reads the application database information from the recording medium 10. The database information thus retrieved is input to the control unit 17 after going through demodulation and error correction by a demodulation unit 12 and an ECC (error-correcting code) decoding unit 13 respectively.

In accordance with the application database information, the control unit 17 outputs a table of PlayLists recorded on the recording medium 10 to a user interface (UI) of the terminal 27. When the user selects from the PlayList table a desired PlayList for reproduction, the control unit 17 accepts the selected PlayList. The control unit 17 then instructs the read unit 11 to read an AV stream file needed to reproduce the PlayList of interest. In turn, the read unit 11 reads the AV stream from the recording medium 10. The AV stream thus retrieved goes through the demodulation unit 12 and ECC decoding unit 13 to become a reproduced DV stream that is input to a buffer 14.

The control unit 17 reads from the buffer 14 a stream of DV frames corresponding to the reproduction segment (i.e., PlayItem) of the AV stream. The data constituted by the DV frames read from the buffer 14 is input to a DV decoding unit 15. In turn, the DV decoding unit 15 decodes the DV frame data into a reproduced AV signal that is output from a terminal 26. The DV frame data retrieved from the buffer 14 is also output through an IEEE 1394 interface 16 to a terminal 25 as the DV stream.

The AV stream is edited as follows: when the user designates desired AV stream reproduction segments recorded on the recording medium 10, a new reproduction path will be created. That is, the IN-point and OUT-point of each of the reproduction segments are input to the control unit 17 through a UI (user interface) at the terminal 27. The control unit 17 in turn generates a PlayList database grouping the AV stream reproduction segments (PlayItems).

Where the user wants to delete part of the AV stream retained on the recording medium 10, the information about the part to be deleted is input to the control unit 17 through the UI at the terminal 27. In response, the control unit 17 modifies the PlayList database so that only the necessary AV stream portions will be referenced, and instructs the write unit 24 to delete the unnecessary part from the AV stream. Furthermore, the control unit 17 updates the content of the applicable Clip information file in keeping with any changes in the Clip AV stream.

Figure 27:
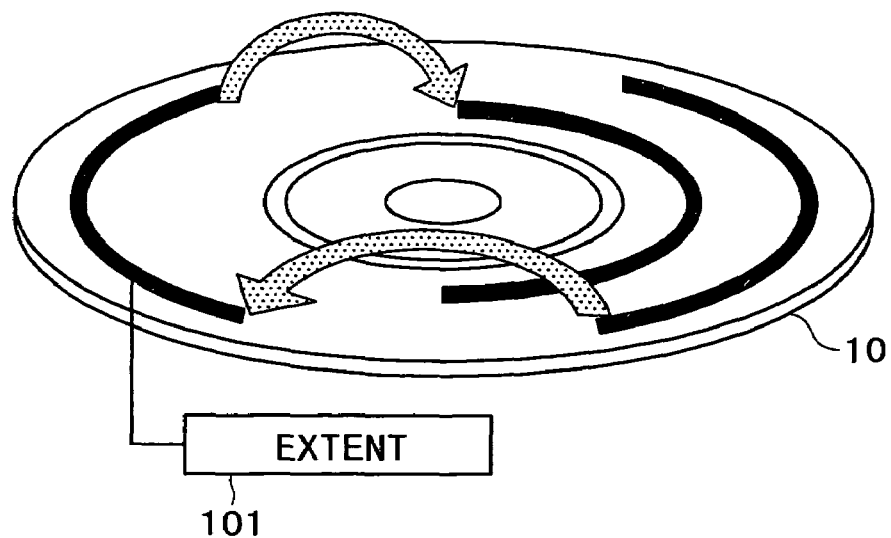
FIG. 27 is a schematic view illustrating what is defined as an Extent.

How the Clip AV stream is laid out on the disc (recording medium 10) will now be described. As shown in FIG. 27, one Clip AV stream is made up of data blocks having consecutive logical addresses over the disc, the blocks being called an Extent each. The length and layout of each Extent 101 are suitably controlled by the DV recording/reproducing apparatus 1 when the Clip AV stream is recorded to the disc. If the Clip AV stream is recorded to the recording medium 10 in a manner complying with the minimum size requirement regarding each Extent 101, then continuous data feed is guaranteed during subsequent reproduction.

Where one file is constituted by a plurality of extents 101 as shown in FIG. 27, a file read operation is executed repeatedly from one Extent 101 to another. During transition from one Extent 101 to the next, it is necessary to change the disc revolving speed and to move an optical pickup of the read unit 11 over the disc.

A maximum access time for the transition is about 0.8 seconds. During that time, no data can be read from the disc by the disc drive of the read unit 11 while pictures and sounds are being decoded and reproduced continuously. That means some provisions are needed to absorb the effects of the access time in ensuring continuous data feed.

A jump takes place from one Extent 101 to the next 101. If the preceding Extent 101 has a sufficiently long byte length, a sufficient amount of data can be placed into the buffer 14 before the jump. During the jump, the buffered data is fed to the decoder for uninterrupted decoding.

In other words, a sufficiently large size of the Extent 101 before a jump guarantees continuous data feed during that jump to the next Extent 101. A sufficient quantity of data can be accumulated in the buffer 14 by having the minimum size of extents 101 limited. A specific minimum Extent size is determined by two factors: the rate of reading data from the disc (recording medium 10), and the drive access time. Whether or not continuous data feed is guaranteed is verified by checking whether the minimum Extent size requirement is complied with.

Figure 28:
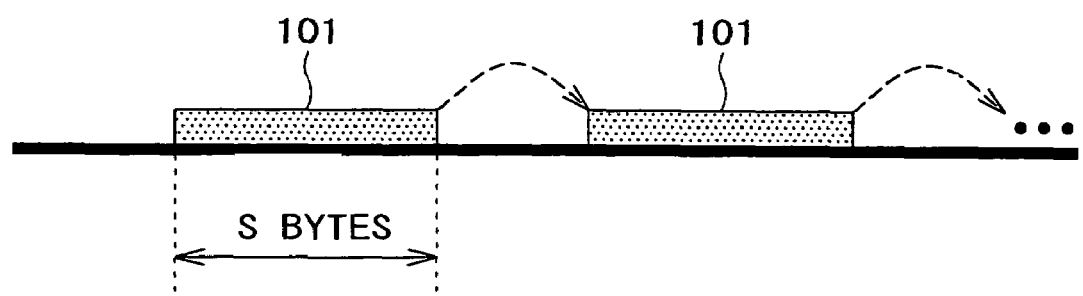
FIG. 28 is a schematic view depicting a size S of the Extent.

FIG. 28 shows how a digital AV signal is recorded in fragmented fashion on the disc. Guaranteeing the recorded digital AV signal to be read at a predetermined bit rate from the recording medium in FIG. 28 requires that the size of each Extent meet the condition defined by the following expression (5):

$$S \times 8/(S \times 8/Rud + Ts) >= Rmax \qquad (5)$$

where, reference character S stands for the size (in bytes) of the Extent 101, Ts for a full-stroke access time (in seconds) from one Extent 101 to the next Extent 101, Rud for the bit rate (bits/second) of reading data from the disc, and Rmax for the bit rate (bits/second) of the AV stream.

That is, a series of extents 101 can be reproduced seamlessly if AV stream data is laid out successively in such a manner that the size of each Extent 101 is at least S bytes.

For example, if the bit rate Rmax of the DV stream is 28.7712 Mbps for the 525/60 system and if Rud=35 (Mbps) and Ts=0.8 (in seconds), then S>=16.16 (MB). In other words, the minimum Extent size (S) is 16.16 (MB).

Where the system is actually in use, AV streams with different bit rates and AV streams pursuant to different encoding methods (MPEG, etc.) might be recorded on the same recording medium 10. It is then necessary to adopt a minimum Extent size that applies commonly to all these AV streams.

The foregoing description has dealt with the conditions for allowing Clip AV stream files to be read consecutively. The procedure described can also be applied to establishing a connection point between PlayItems, whereby the value of the "connection_condition" field is determined. How to determine the connection condition value will now be described.

Figure 29:
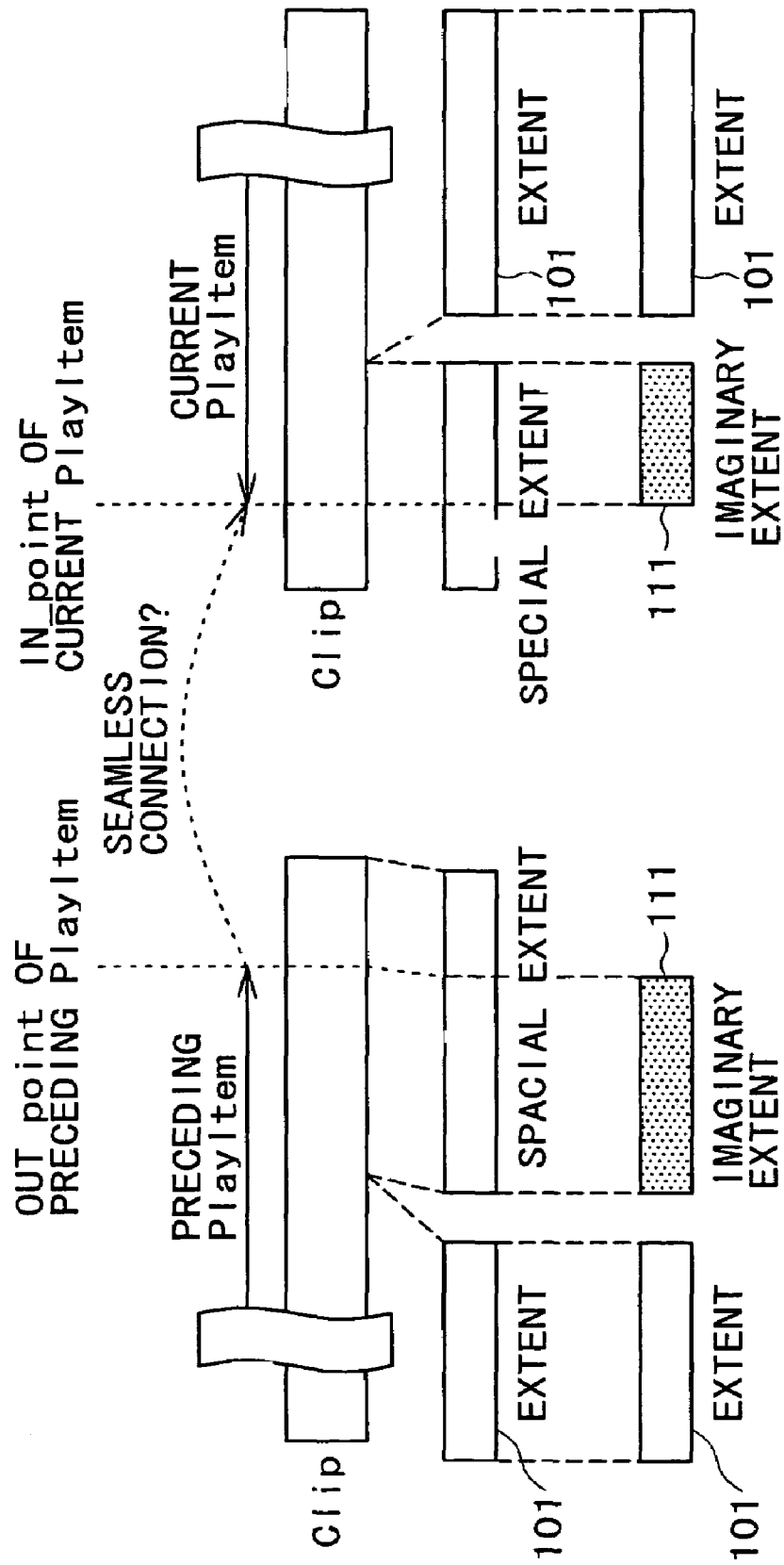
FIG. 29 is a schematic view indicating typical Imaginary Extents.
Figure 30:
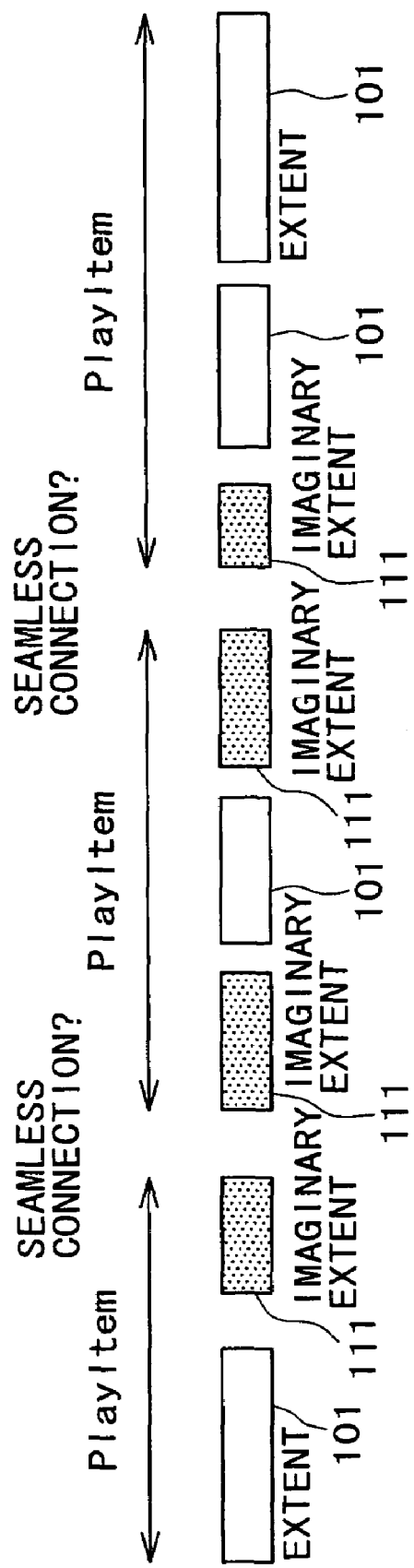
FIG. 30 is a schematic view showing how PlayItems are presented using Imaginary Extents.

FIG. 29 depicts typical Imaginary Extents. Each PlayItem has its reproduction range delimited by an IN-point and an OUT-point. Of the Extent 101 including its IN-points and OUT-points, the actual portion to be decoded based on the PlayItems is defined as "Imaginary Extents" 111. (The portions determined by "Trailing_data_size" and "Leading_data_size" in FIG. 16 are not decoded and thus will not be included in the Imaginary Extents). There are two Imaginary Extents, one delimited by the OUT-point of the preceding PlayItem, the other defined by the IN-point of the current PlayItem. In FIG. 29, a special Extent containing the OUT-point of the preceding PlayItem has one Imaginary Extent 111 reproduced on the basis of the preceding PlayItem, and another special Extent including the IN-point of the current PlayItem has another Imaginary Extent 111 reproduced in keeping with the current PlayItem. In abstract terms, a given PlayList may be understood to compose of two kinds of extents, i.e., extents 101 and Imaginary Extents 111 as shown in FIG. 30.

When any one PlayItem is reproduced, it might happen that the first Imaginary Extent 111 of the PlayItem is too small to furnish enough data for accumulation into the buffer 14 before a jump is effected to the next Extent 100. In that case, reproduction is not started simultaneously with the reading of the first Imaginary Extent 111. Instead, the Imaginary Extent 111 as a whole is read, and a jump is effected to the following Extent 101 so that a certain amount of the Extent 101 is read to permit sufficient data accumulation into the buffer 14. Then reproduction is started. This procedure on a single PlayItem always guarantees seamless reproduction.

Figure 24:
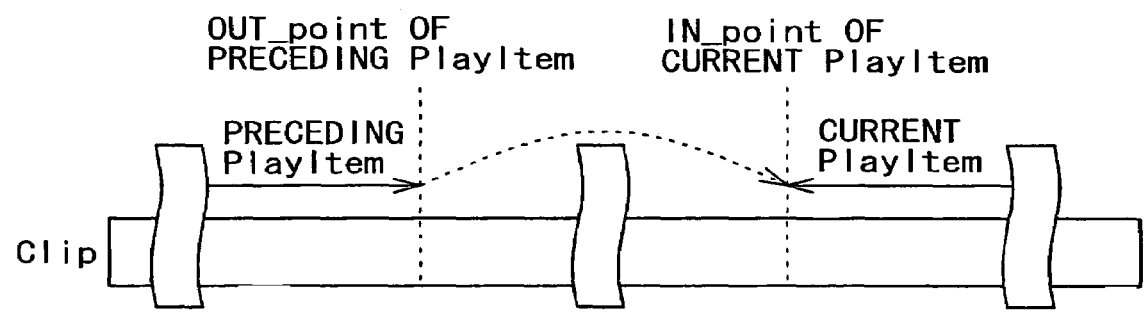
FIG. 24 is a schematic view exhibiting another connection in effect when the "connection_condition" value is set to "1"

If it is desired to reproduce a plurality of PlayItems seamlessly (e.g., where the data in FIG. 24 is to be reproduced continuously), the reproduction, once started, cannot be interrupted to allow data to be read and accumulated into the buffer 14. That means the minimum Extent condition must be met at each connection point between PlayItems so that the buffer 14 will not be exhausted during the reproduction.

Where PlayItems are to be reproduced consecutively in a designated order, seamless reproduction is guaranteed only on condition that the Imaginary Extents 111 before and after each connection point have the minimum Extent size each.

Figure 31:
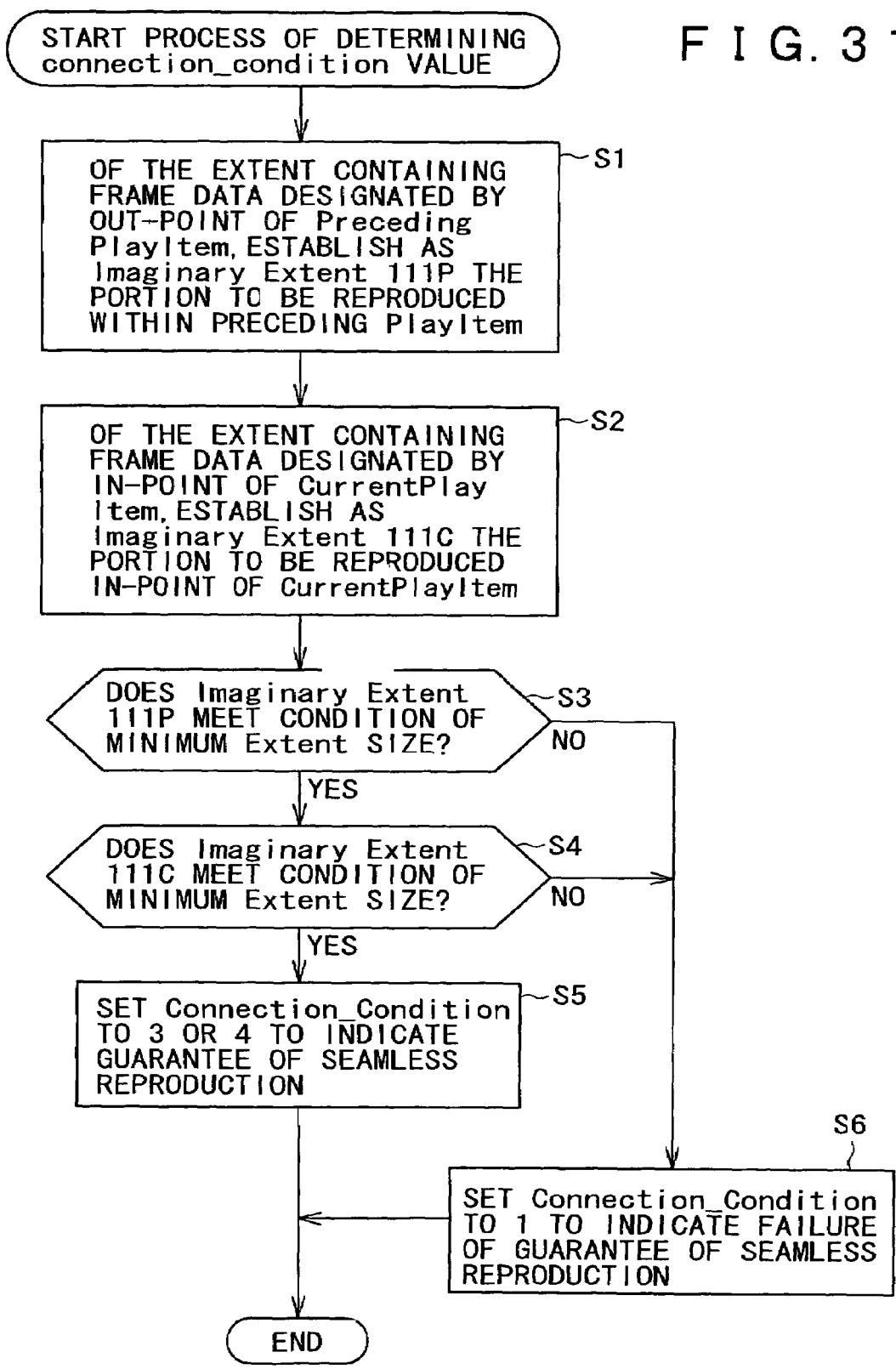
FIG. 31 is a flowchart of steps constituting a typical process of determining a "connection_condition" value.

Whether or not the condition above is met is ascertained by carrying out the steps constituting the flowchart of FIG. 31. This flowchart represents the process of determining the value of the "connection_condition" field.

Figure 32:
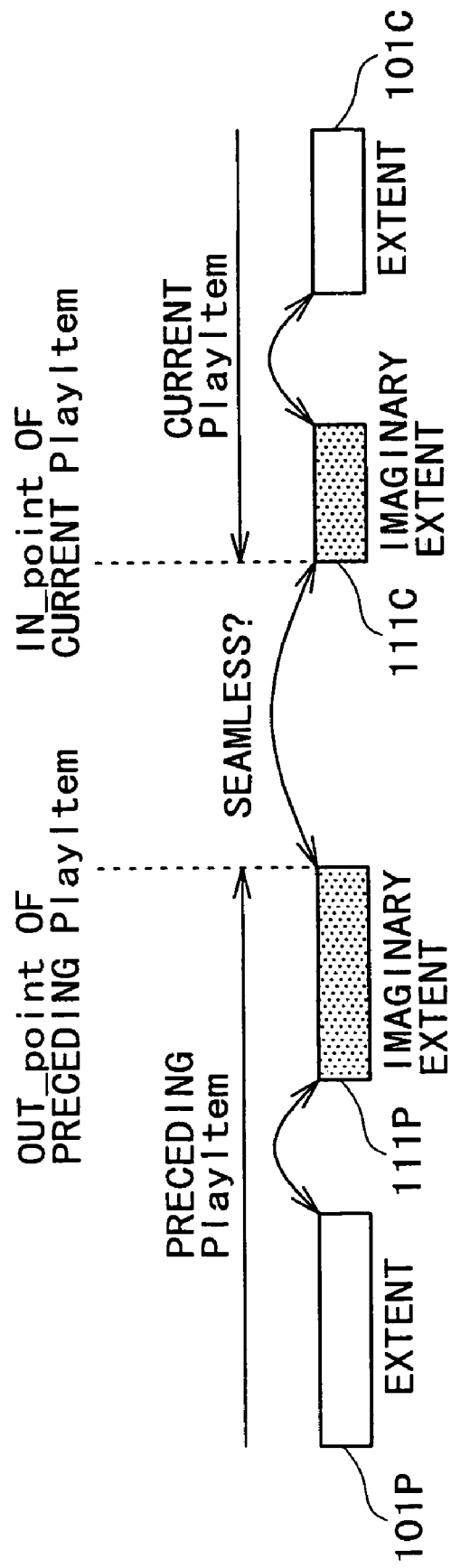
FIG. 32 is a schematic view picturing how a connection point is evaluated based on Imaginary Extents.

In step S1, of the Extent containing the frame data designated by the OUT-point of the preceding PlayItem, the control unit 17 establishes as an Imaginary Extent 111P the portion to be reproduced within the preceding PlayItem, as shown in FIG. 32.

In step S2, of the Extent containing the frame data designated by the IN-point of the current PlayItem, the control unit 17 establishes as an Imaginary Extent 111C the portion to be reproduced within the current PlayItem, as indicated in FIG. 32.

In step S3, the control unit 17 determines whether or not the Imaginary Extent 111P meets the condition of the minimum Extent size, i.e., the condition for continuous data feed. More specifically, a check is made to see whether the following expression (6) is met:

$$S(P) >= S(E) \qquad (6)$$

where, reference character S(P) represents the size of the Imaginary Extent 111P, and S(E) denotes the minimum Extent size for ensuring continuous data feed. If the expression (6) above is found to be satisfied, then control is passed on to step S4. In step S4, the control unit 17 determines whether or not the Imaginary Extent 111C meets the condition of the minimum Extent size for continuous data feed. More specifically, a check is made to see whether the following expression (7) is met:

$$S(I) >= S(E) \qquad (7)$$

where, reference character S(I) stands for the size of the Imaginary Extent 111C, and S(E) represents the minimum Extent size for ensuring continuous data feed. If the expression (7) above is found to be satisfied, then control is passed on to step S5. In step S5, the control unit 17 sets the "connection_condition" field to 3 or 4 (to indicate guarantee of seamless reproduction), and the processing is terminated. A check to see if a bridge sequence is in effect is omitted here.

If in step S3 the expression (6) is not found satisfied or if in step S4 the expression (6) is not found to meet, then control is passed on to step S6. In step S6, the control unit 17 sets the "connection_condition" field to 1 (to indicate failure of guarantee of seamless reproduction), and the processing is terminated. In the manner described, the steps in FIG. 31 determine what the connection condition specifies.

Figure 33:
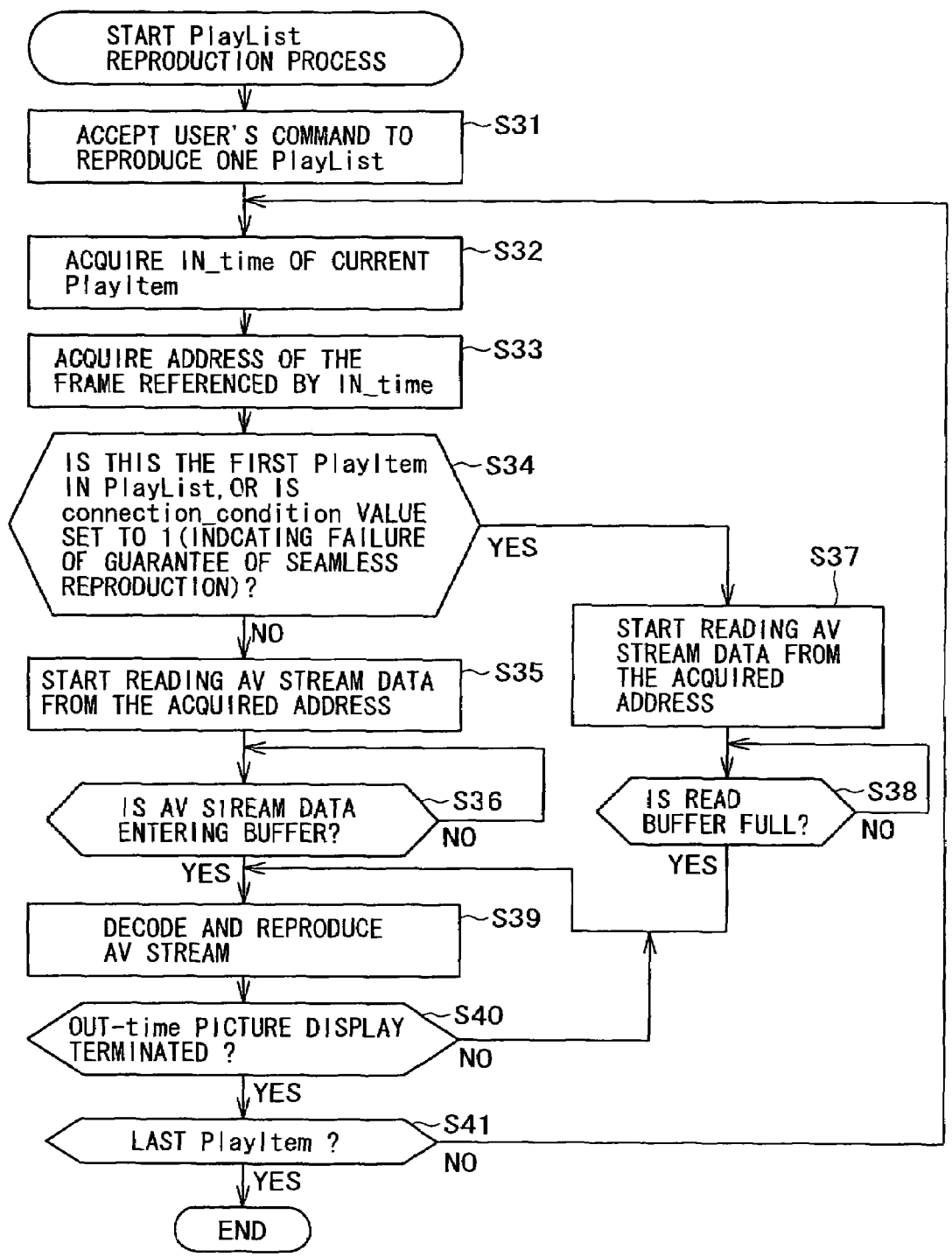
FIG. 33 is a flowchart of steps constituting a PlayList reproduction process.

Described below with reference to the flowchart of FIG. 33 is how a PlayList is reproduced from the recording medium 10 on which PlayLists are recorded along with their connection_condition values. The flowchart of FIG. 33 outlines the process in which the PlayItems making up a user-selected PlayList are reproduced one after another with emphasis placed on the connection_condition values involved. The process is started at the user's command.

In step S31, the control unit 17 receives the user's command to reproduce one PlayList. In step S32, the control unit 17 reads files "xxxxx.rpls" and "yyyyy.vpls" in which information about the selected PlayList is written, whereby an IN-time of the PlayItem to be reproduced is acquired. Illustratively, if the user's command designates reproduction of the PlayList corresponding to the DVF-sequence of the Clip A shown in FIG. 21, an IN_time1 for the current PlayItem1 is obtained.

In step S33, the control unit 17 reads an information file "zzzzz.clpi" of the Clip referenced by the current PlayItem in order to acquire that frame number (byte position) of the Clip AV stream file that corresponds to the acquired IN_time.

In step S34, the control unit 17 determines whether the first PlayItem of the PlayList is selected, or whether the "connection_condition" field of the PlayItem to be reproduced next is set to 1. In the example of FIG. 21, the control unit 17 reads the "connection_condition" information possessed by the PlayItem2 to be reproduced following the PlayItem1.

If the first PlayItem of the PlayList is found selected, then the data constituting the next Extent is read in a sufficient amount and accumulated into the buffer 14 before reproduction is started. The reproduction, when started, is then guaranteed to proceed seamlessly. If the "connection_condition" field is found set to 1 (to indicate failure of guarantee of seamless reproduction), then the ongoing reproduction is interrupted to let the next Extent be read. After a sufficient amount of data has been read and accumulated into the buffer 15, the reproduction is resumed. This allows individual PlayItems to be reproduced seamlessly.

More specifically, if in step S34 the first PlayItem of the PlayList is detected or if in step S34 the "connection_condition" field of the PlayItem to be reproduced next is found set to 1 (i.e., to indicate failure of guarantee of seamless reproduction upon connection to the following PlayItem), then step S37 is reached. In step S37, the control unit 17 causes the read unit 11 to start reading AV stream data from the address of the frame referenced by the IN_time acquired in step S33. The data thus retrieved is sent to the buffer 14 through demodulation and error correction processes by the demodulation unit 12 and ECC decoding unit 13.

In step S38, the control unit 17 determines whether the read buffer 14 has become full. If the read buffer 14 is not found to be full, the control unit 17 waits for the buffer 14 to be filled with data. When the read buffer 14 is found to be full in step S38, step S39 is reached.

Although the reading of data is started in step S37 as described, the start of decoding is delayed in step S38 until the read buffer 14 is found filled with data. If the decoding were started before the read buffer 14 is full, the buffer 14 could become exhausted during a jump from one Extent to the next halfway through the ongoing PlayItem reproduction, disrupting the seamless reproduction of the PlayItem.

Because Extent boundaries are invisible to the user, discontinuities during the PlayItem reproduction seem awkward and incomprehensible from the user's viewpoint. Such clumsiness is averted by intentionally stopping the decoding on each PlayItem boundary to accumulate data into the read buffer 14, before the reproduction is resumed. In other words, all discontinuities that may occur during PlayItem reproduction are moved onto the PlayItem boundaries, whereby awkward disruptions of reproduction are avoided.

If in step S34 the PlayItem in question is not found to be the first PlayItem of the PlayList, or if in step S34 the "connection_condition" value of the PlayItem to be reproduced next is not found to be 1 (i.e., 3 or 4 indicating guarantee of seamless reproduction), then step S35 is reached. In step S35, the control unit 17 causes the read unit 11 to start reading AV stream data from the address of the frame referenced by the IN_time acquired in step S33. The data thus retrieved is sent to the buffer 14 through demodulation and error correction processes by the demodulation unit 12 and ECC decoding unit 13.

In step S36, the control unit 17 determines whether the AV stream data is supplied to the read buffer 14. If the AV stream data is not found to feed to the read buffer 14, the control unit 17 waits for the buffer 14 to be supplied with the data.

If in step S36 the read buffer 14 is found to be fed with the AV stream data, or if in step S38 the read buffer 14 is found to be full, then step S39 is reached. In step S39, the control unit 17 causes the DV decoding unit 15 to decode the AV stream for reproduction.

More specifically, a check is made in step S36 to see whether the AV stream data have been sent to the read buffer 14. When the data is found to feed to the buffer 14 in step S38, step S39 is reached and the buffered data is decoded. The decoding can be started before the read buffer 14 has become full because seamless reproduction was guaranteed earlier in step S34. That is, the data is supplied to the read buffer 14 at a rate sufficiently higher than the decoding rate, so that a sufficient amount of data is guaranteed to exist in the read buffer 14 upon or prior to the jump to the next Extent.

Step S39 is followed by step S40 in which the control unit 17 determines whether reproduction of the frame picture is brought to an end, the frame being referenced by the out-time corresponding to the IN_time acquired in step S32. If reproduction of the picture of the frame referenced by the OUT_time is not found to have ended, control is returned to step S39. The subsequent steps are then repeated.

If in step S40 the reproduction of the picture of the frame referenced by the OUT_time is found terminated, step S41 is reached. In step S41, the control unit 17 determines whether reproduction of the last PlayItem of the PlayList selected in step S31 is brought to an end. If the reproduction of the last PlayItem is not found to have ended, then control is returned to step S32 and reproduction of the next PlayItem is started.

If in step S41 the reproduction of the last PlayItem is found terminated, that means the reproduction of the PlayList selected by the user in step S31 has come to an end. The process is then terminated.

In the flowchart of FIG. 33, prior to reproduction of the PlayItem whose "connection_condition" field is found set to 1 (to indicate failure of guarantee of seamless reproduction), the start of decoding is delayed until the read buffer 14 becomes full. This is the simplest way of managing the buffer. If the Extent to be read has a sufficiently large size, the decoding may be started before the read buffer 14 becomes full and the data may still be accumulated progressively into the buffer. Before the jump to the next Extent, a sufficient amount of data may already be placed in the read buffer 14.

A system capable of calculating the necessary wait time depending on the Extent size can thereby reduce the time to interrupt reproduction in step S38.

The foregoing description has dealt with the flowchart of steps for specifying how to utilize the connection condition settings during PlayList reproduction. In that context, the connection_condition constitutes information that may be used to enhance the quality of reproduction.

The emphasis above was placed on how to determine seamless or non-seamless connection between PlayItems.

What follows is a description of how to change non-seamless connection, found between PlayItems, into seamless connection. Although the non-seamless connection between PlayItems is not against standard rules, the user may optionally wish to enhance the quality of reproduction by eliminating non-seamless connections. The change from non-seamless to seamless connection is accomplished by the recording unit 2 carrying out the processing described below.

Figure 34:
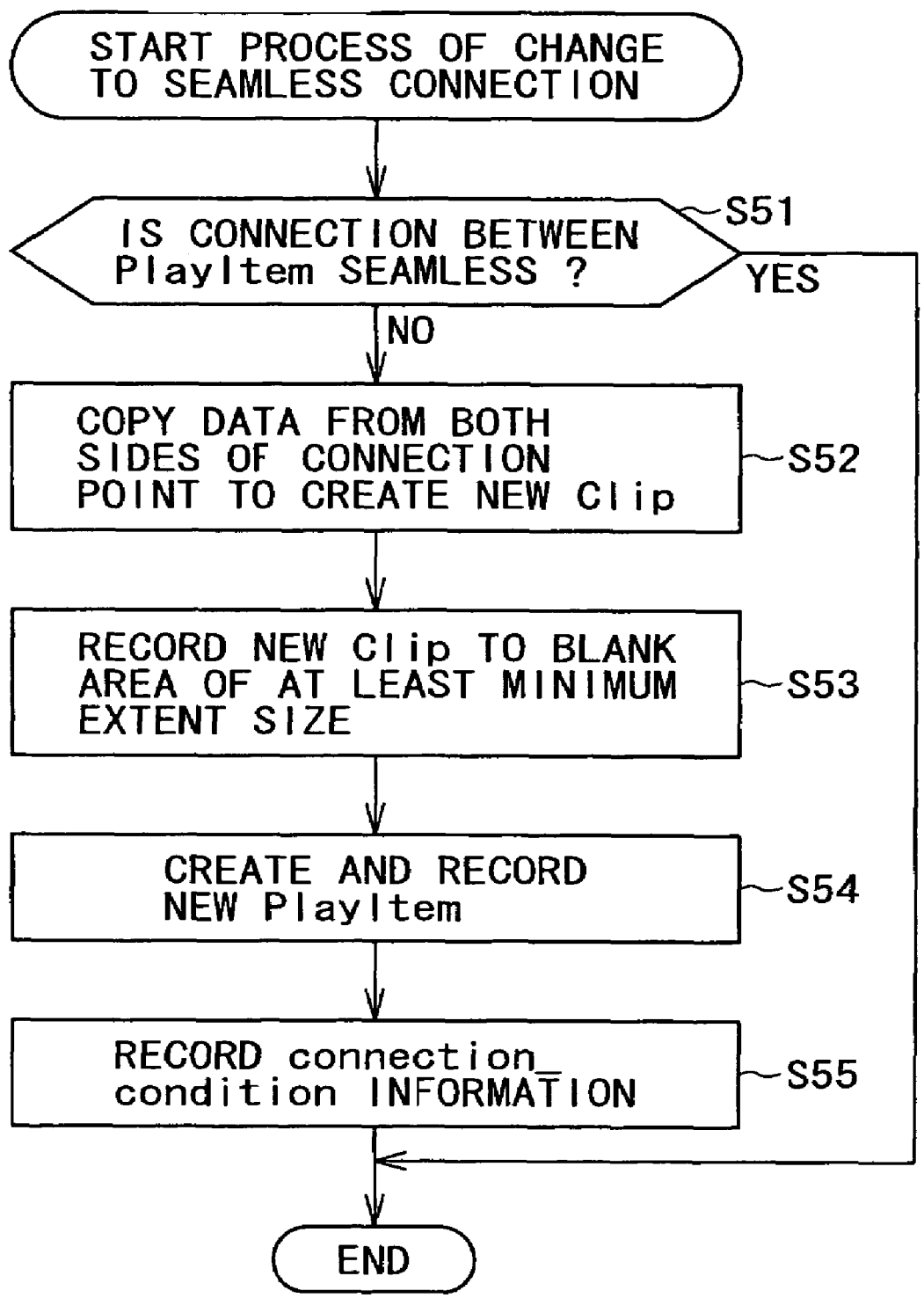
FIG. 34 is a flowchart of steps constituting a typical process of change to seamless connection.

FIG. 34 is a flowchart of steps constituting a typical process of changing non-seamless connection to seamless connection between PlayItems. This process is started at the user's command to change a connection between PlayItems, found to be non-seamless, into a seamless connection.

Figure 35:
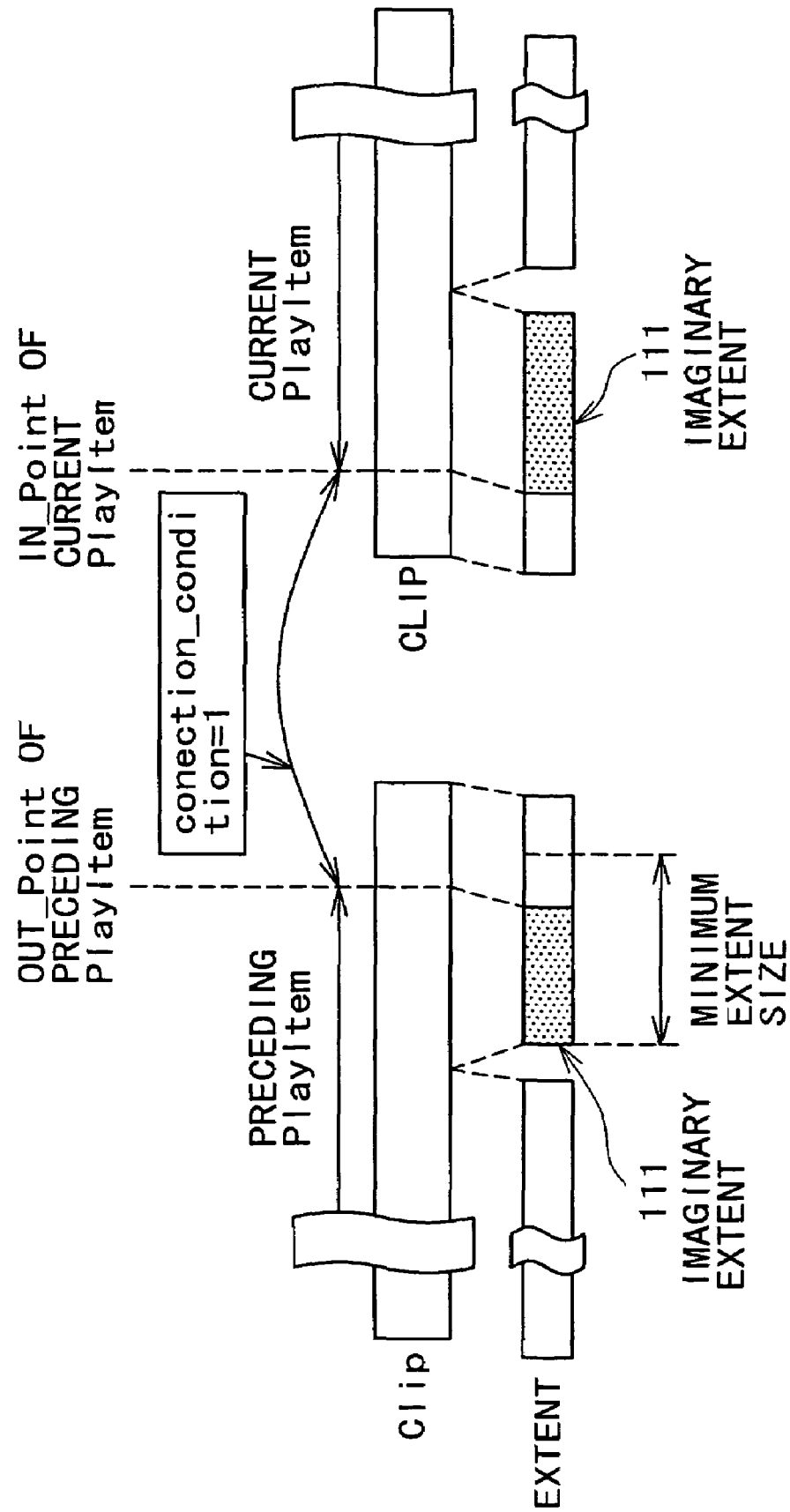
FIG. 35 is a schematic view of an example in which an Imaginary Extent size is smaller than a minimum Extent size at a connection point between PlayItems.

In step S51, the control unit 17 determines whether the connection between PlayItems is seamless (i.e., checks to see if the "connection_condition" value of the currently selected PlayItem is 3 or 4). If the connection between PlayItems is not found to be seamless (with the "connection_condition" value of the selected PlayItem set to 1), e.g., if the size of an Imaginary Extent 111 in FIG. 35 is smaller than the minimum Extent size (i.e., when the minimum Extent size requirement is not met), then step S52 is reached. In step S52, the control unit 17 copies data from both sides of the connection point found to be non-seamless in order to create a new Clip.

In step S53, the control unit 17 records the Clip created anew in step S52 to a blank area having at least the minimum Extent size on the recording medium 10.

In step S54, the control unit 17 generates a new PlayItem based on the new Clip recorded in step S53. The newly created PlayItem is recorded to the recording medium 10.

Figure 36:
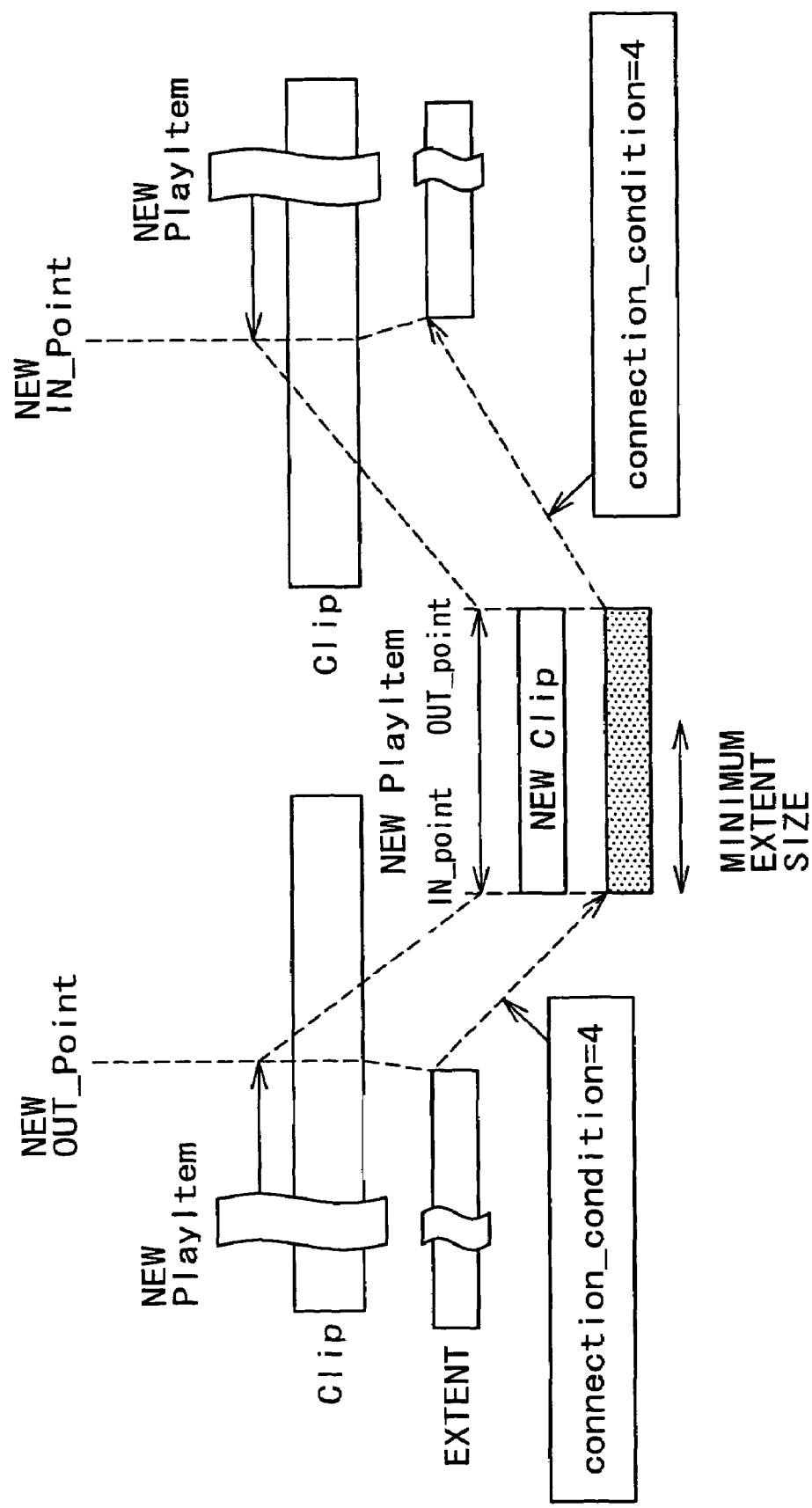
FIG. 36 is a schematic view showing how a change is made from non-seamless connection to seamless connection by generating a new Clip and a new PlayItem.

More specifically, as shown in FIG. 35, an Extent smaller than the minimum Extent size could be formed depending on where the IN-point (of the current PlayItem) and the OUT-point (of the preceding PlayItem) are located. In that case, as depicted in FIG. 36, a new Clip is created by copying data from both sides of the connection point, and the Clip is recorded to a blank area having at least the minimum Extent size. At the time of reproduction, the PlayItem pointing to this new Clip (new PlayItem) is co-opted into a reproduction path that is implemented in compliance with the minimum Extent size condition.

In step S55, the control unit 17 generates and records "connection_condition" information (connection_condition=4) about the PlayItem created anew in step S54. After this (i.e., following step S55), the process is terminated. If in step S51 the connection between PlayItems is found to be seamless, then steps S52 through S55 are skipped and the processing is terminated then and there.

Because the data making up the new Clip are copied from the original Clip, the locations of the IN-point and OUT-point of the original Clip are changed. That also means one more PlayItem (i.e., the new PlayItem) is added to the PlayList. In practice, a new PlayList (Virtual PlayList) is created while the original PlayList is left intact.

The above process of accomplishing seamless connection may also be used to provide the effect of smooth scene change, with a scene change picture inserted into a given connection point between PlayItems.

The foregoing procedure was shown carrying out seamless reproduction by creating the new Clip and inserting the new PlayItem. Alternatively, a bridge Clip may be created to permit seamless connection as shown in FIG. 37, with no additional PlayItem generated. In the example of FIG. 37, a new Clip is created by copying data from extents on both sides of the connection point just as in FIG. 36, except that the newly created Clip is regarded not as an independent Clip but as part of a Clip 2 (following Clip), i.e., as a bridge Clip. An OUT_time1, the OUT-point of the preceding PlayItem, and an IN_time2, the IN-point of the current PlayItem, are considered to designate the bridge Clip; the number of PlayItems remains unchanged. Reproduction by way of the new bridge Clip proceeds as follows: following a halfway exit from the Extent of the preceding PlayItem (i.e., from FN_exit_from_preceding_Clip in FIG. 37), control is shifted to reproduction of the bridge Clip from the beginning. At the end of the reproduction of the bridge Clip, reproduction control is moved to a halfway entry into the Extent of the current PlayItem (i.e., into FN_enter_to_following_Clip in FIG. 37). Implementing this reproduction path provides seamless reproduction. One difference between the examples of FIGS. 36 and 37 is whether the newly created Extent is considered to be an independent Clip or a bridge Clip. Another difference is that the IN-point and OUT-point of the PlayItem in FIG. 37 are displaced from those in FIG. 36. However, the method of copying data from both sides of the connection point so as to create a new Extent complying with the minimum Extent size requirement remains the same. Given its standardized characteristics, the bridge Clip is also used to provide seamless AV stream connection in MPEG format. That means the bridge Clip offers the advantage of providing a common ground for reproduction management in MPEG and DV formats. The "connection_condition" field being set to 3 represents a connection point where a bridge Clip guarantees seamless reproduction between PlayItems.

The exit defined by "FN_exit_from_preceding_Clip" and the entry set as "FN_enter_to_following_Clip" are shown recorded in the data structure of FIG. 8. These and other syntax, data structure, and standardized features provide a basis for suitably managing the data content and reproduction information held on the recording medium 10. This in turn allows the user to verify prior to reproduction the content of data recorded on the recording medium and to reproduce the necessary data from the medium accordingly.

In the examples of the invention above, the DV stream was described as a typical AV stream. Alternatively, the invention also applies to other streams in which each video frame has a fixed byte data size. In addition, data may be recorded, deleted and reproduced to and from the disc in units other than sectors.

The invention further applies to a system that records and reproduces streams such as the DV stream in which each video frame has a fixed byte size, to and from a recording medium on which data is managed using logical sectors as a minimum data recording unit each. That system may have "connection_condition" information added to the information expressing a PlayList structure for reproducing desired portions of a given stream in a desired order, the "connection_condition" information specifying whether or not to guarantee seamless reproduction between the PlayItems making up the PlayList. In operation, the system can check the "connection_condition" information to see if seamless reproduction is possible between any two PlayItems in the PlayList.

The connection condition value is determined by the reproducing apparatus checking, of the extents including the frames designated by the IN-point and OUT-point of the PlayItems involved, only those portions reproduced as Imaginary Extents from the PlayItems, to see whether these Imaginary Extents satisfy the requirement for continuous Extent feed (i.e., connection condition). Such "connection_condition" information set to each PlayItem allows the reproducing apparatus to determine, before reading the DV stream, whether seamless reproduction is possible across a given connection point between PlayItems.

At connection points where seamless reproduction is guaranteed, the reproducing apparatus can continuously read and reproduce data. At a connection point where seamless reproduction is not guaranteed, the reproducing apparatus can determine beforehand whether processes such as fade-in and fade-out to tide over the discontinuity are required. The reproducing apparatus can then halt reproduction temporarily at the discontinuous connection point to accumulate a sufficient amount of data in the buffer, thereby preventing the disruption from taking place during PlayItem reproduction and enhancing reproduction quality.

The series of steps described above may be executed by hardware or by software. For software-based processing to take place, programs constituting processing sequences may be either loaded into a computer from its dedicated hardware for execution, or installed upon program execution from a suitable program storage medium into a general-purpose personal computer or like equipment capable of executing diverse functions.

As shown in FIG. 26, the program storage medium is offered to users apart from computers not only as a package medium constituted by magnetic disks 41 (including floppy discs), optical disks 42 (including CD-ROM (Compact Disc-Read Only Memory) and DVD (Digital Versatile Disc)), magneto-optical disks 43 (including MD (Mini-Disc)), or a semiconductor memory 44, each medium containing the necessary programs; but also in the form of a ROM or a hard disk drive (not shown) which contains the programs and which is incorporated beforehand in the computer.

In this specification, the processing steps that describe the programs for causing the computer to perform the necessary operations may not represent solely the processes that are to be carried out in the depicted sequence in the flowcharts (i.e., on a time series. basis); the steps may also represent processes that are conducted parallelly or individually.

In this specification, the term "system" refers to an entire configuration made up of a plurality of component devices.

INDUSTRIAL APPLICABILITY

As described and according to the first aspect of the invention, where data recorded on an information recording medium is edited so as to reproduce desired video data in a desired order, it is possible to know whether seamless reproduction is available at a given connection point between data segments. It is also possible to control such reproduction in suitable fashion.

According to the second aspect of the invention, it is possible to edit video data constituting a non-seamless connection into those that may be reproduced seamlessly.

The invention claimed is:

1. A data recording apparatus for recording video data to an information recording medium in predetermined recording units, said data recording apparatus comprising:

a generating section which, when said video data recorded on said information recording medium is edited, is configured to generate connection information about each of a plurality of items arranged in a temporarily serial manner to form list information serving as a unit for reproducing the edited video data, each of said items designating a size of a corresponding portion of said edited video data that includes a series of data blocks having continuous logical addresses on said information recording medium;

a recording section configured to record said edited video data, said list information, and said connection information to said information recording medium; and said generating section is further configured to generate said connection information based on the size of the corresponding portion of said edited video data, said connection information indicating an ability of a reproducing unit to reproduce said edited video data continuously in time.

2. A data recording apparatus according to claim 1, further comprising a determining section configured to determine whether a size of each of two portions of said edited video data which are adjacent to a connection point connecting the two portions of said of said edited video data exceeds a predetermined amount; and said generating section is further configured to generate said connection information based on a result of the determination by said determining section.

3. A data recording apparatus according to claim 2, wherein said connection information indicates either a guarantee of temporally continuous reproduction of said edited video data, or failure of said guarantee.

4. A data recording apparatus according to claim 1, wherein, said recording section is configured to copy the two portions of said edited video data which are adjacent to the connection point to a blank area of said information recording medium.

5. A data recording apparatus according to claim 1, wherein said video data have frames each with data encoded therein.

6. A data recording apparatus according to claim 1, wherein said video data have frames each with data in a fixed amount.

7. A data recording method for use with a data recording apparatus for recording video data to an information recording medium in predetermined recording units, said data recording method comprising the steps of:

editing said video data recorded on said information recording medium to produce edited video data;

generating connection information about each of a plurality of items arranged in a temporarily serial manner to form list information serving as a unit for reproducing the edited video data, each of said items designating a size of a corresponding portion of said video data that includes a series of data blocks having continuous logical addresses on said information recording medium;

recording said edited video data, said list information, and said connection information to said information recording medium; and generating said connection information based on the size of the corresponding portion of said edited video data, said connection information indicating an ability of a reproducing unit to reproduce said edited video data continuously in time.

8. A computer-readable medium which stores a computer program which when executed on a computer causes the computer to control a data recording apparatus for recording video data to an information recording medium in predetermined recording units, including the steps of:

editing said video data recorded on said information recording medium to produce edited video data;

generating connection information about each of a plurality of items arranged in a temporarily serial manner to form list information serving as a unit for reproducing the edited video data, each of said items designating a size of a corresponding portion of said video data that includes a series of data blocks having continuous logical addresses on said information recording medium;

recording said edited video data, said list information, and said connection information to said information recording medium; and generating said connection information based on the size of the corresponding portion of said edited video data, said connection information indicating an ability of a reproducing unit to reproduce said edited video data continuously in time.

9. A data recording apparatus for recording video data to an information recording medium in predetermined recording units, said data recording apparatus comprising:

a generating section which, when said video data recorded on said information recording medium is edited, is configured to generate connection information about each of a plurality of items arranged in a temporarily serial manner to form list information serving as a unit for reproducing the edited video data, each of said items designating a size of a corresponding portion of said edited video data that includes a series of data blocks having continuous logical addresses on said information recording medium;

a recording section configured to record said edited video data, said list information, and said connection information to said information recording medium; and said generating section is further configured to generate said connection information based on the size of the corresponding portion of said edited video data, said connection information indicating an ability of a reproducing unit to reproduce said edited video data continuously in time;

wherein, said recording section is configured to copy the two portions of said edited video data which are adjacent to the connection point to a blank area of said information recording medium; and wherein, said generating section is further configured to change said connection information into information indicating the guarantee of temporarily continuous reproduction of said edited video data if said recording section copies the two portions of said edited video data which are adjacent to the connection point.

10. A data recording method for use with a data recording apparatus for recording video data to an information recording medium in predetermined recording units, said data recording method comprising the steps of:

editing said video data recorded on said information recording medium to produce edited video data;

generating connection information about each of a plurality of items arranged in a temporarily serial manner to form list information serving as a unit for reproducing the edited video data, each of said items designating a size of a corresponding portion of said video data that includes a series of data blocks having continuous logical addresses on said information recording medium;

recording said edited video data, said list information, and said connection information to said information recording medium; and generating said connection information based on the size of the corresponding portion of said edited video data, said connection information indicating an ability of a reproducing unit to reproduce said edited video data continuously in time;

copying the two portions of said edited video data which are adjacent to the connection point to a blank area of said information recording medium; and changing said connection information into information indicating a guarantee of temporarily continuous reproduction of said edited video data if said copying copies the two portions of said edited video data which are adjacent to the connection point.

11. A computer-readable medium which stores a computer program which when executed on a computer causes the computer to control a data recording apparatus for recording video data to an information recording medium in predetermined recording units, including the steps of:
- editing said video data recorded on said information recording medium to produce edited video data;
- generating connection information about each of a plurality of items arranged in a temporarily serial manner to form list information serving as a unit for reproducing the edited video data, each of said items designating a size of a corresponding portion of said video data that includes a series of data blocks having continuous logical addresses on said information recording medium;
- recording said edited video data, said list information, and said connection information to said information recording medium; and
- generating said connection information based on the size of the corresponding portion of said edited video data, said connection information indicating an ability of a reproducing unit to reproduce said edited video data continuously in time;
- copying the two portions of said edited video data which are adjacent to the connection point to a blank area of said information recording medium; and
- changing said connection information into information indicating a guarantee of temporarily continuous reproduction of said edited video data if said copying copies the two portions of said edited video data which are adjacent to the connection point.

12. A data recording apparatus for recording video data to an information recording medium in predetermined recording units, said data recording apparatus comprising:
- means for generating connection information about each of a plurality of items arranged in a temporarily serial manner to form list information serving as a unit for reproducing the edited video data when said video data recorded on said information recording medium is edited, each of said items designating a size of a corresponding portion of said edited video data that includes a series of data blocks having continuous logical addresses on said information recording medium;
- a recording section configured to record said edited video data, said list information, and said connection information to said information recording medium; and
- said means for generating generates said connection information based on the size of the corresponding portion of said edited video data, said connection information indicating an ability of a reproducing unit to reproduce said edited video data continuously in time.

* * * * *

UNITED STATES PATENT AND TRADEMARK OFFICE
CERTIFICATE OF CORRECTION

PATENT NO.        : 7,369,745 B2
APPLICATION NO.   : 10/479512
DATED             : May 6, 2008
INVENTOR(S)       : Toshiya Hamada et al.

It is certified that error appears in the above-identified patent and that said Letters Patent is hereby corrected as shown below:

Column 15, line 4, change "connection _ ondition" to -- connection _ condition --.

Signed and Sealed this

Twentieth Day of January, 2009

JON W. DUDAS
*Director of the United States Patent and Trademark Office*